US010980036B2

(12) United States Patent
Lu et al.

(10) Patent No.: US 10,980,036 B2
(45) Date of Patent: Apr. 13, 2021

(54) SYSTEMS AND METHODS FOR RESOURCE SENSING FOR SIDELINK OPERATION

(71) Applicant: TELEFONAKTIEBOLAGET LM ERICSSON (PUBL), Stockholm (SE)

(72) Inventors: Qianxi Lu, Beijing (CN); Marco Belleschi, Solna (SE); Stefano Sorrentino, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/324,525

(22) PCT Filed: Aug. 9, 2017

(86) PCT No.: PCT/IB2017/054872
§ 371 (c)(1),
(2) Date: Feb. 8, 2019

(87) PCT Pub. No.: WO2018/029620
PCT Pub. Date: Feb. 15, 2018

(65) Prior Publication Data
US 2019/0191442 A1    Jun. 20, 2019

(30) Foreign Application Priority Data

Aug. 9, 2016  (WO) ................ PCT/CN2016/094209

(51) Int. Cl.
*H04W 72/02*      (2009.01)
*H04W 74/06*      (2009.01)
(Continued)

(52) U.S. Cl.
CPC ......... *H04W 72/087* (2013.01); *H04W 36/06* (2013.01); *H04W 36/26* (2013.01);
(Continued)

(58) Field of Classification Search
CPC ........... H04W 4/00; H04W 4/40; H04W 4/44; H04W 4/46; H04W 40/48; H04W 8/18;
(Continued)

(56) References Cited

U.S. PATENT DOCUMENTS

2015/0156806 A1* 6/2015 Pan ........................ H04W 76/14
455/39
2015/0173060 A1* 6/2015 Ge .......................... H04W 4/70
370/252

(Continued)

FOREIGN PATENT DOCUMENTS

IN    201717046284 A    2/2018
WO    2015142093 A1    9/2015
(Continued)

OTHER PUBLICATIONS

Huawei, et al., Sidelink resource configuration during handover, R2-162290, 3GPP TSG-RAN WG2 #93bis, Dubrovnik, Croatia, Apr. 11-15, 2016.

(Continued)

*Primary Examiner* — San Htun

(57) ABSTRACT

According to certain embodiments, a method by a wireless device is provided for resource sensing. The method includes acquiring, from a network node, an indication of resources associated with a first resource pool. The first resource pool is for use in an exceptional communication with another device. A triggering event associated with signalling from the network node is identified. Based on the triggering event, a need for the exceptional communication with the other device is determined. At least one resource is selected from the first resource pool, and a message is transmitted using the at least one resource selected from the first resource pool.

14 Claims, 13 Drawing Sheets

(51) Int. Cl.
*H04W 4/40* (2018.01)
*H04W 72/08* (2009.01)
*H04W 74/00* (2009.01)
*H04W 36/06* (2009.01)
*H04W 36/26* (2009.01)
*H04W 74/08* (2009.01)

(52) U.S. Cl.
CPC ......... *H04W 72/02* (2013.01); *H04W 74/006* (2013.01); *H04W 4/40* (2018.02); *H04W 74/0808* (2013.01); *H04W 74/0833* (2013.01)

(58) Field of Classification Search
CPC .................. H04W 8/22; H04W 28/00; H04W 28/02–215; H04W 28/0231; H04W 28/0252; H04W 28/16; H04W 28/26; H04W 36/06; H04W 36/16; H04W 36/24; H04W 36/26; H04W 88/02–06; H04W 92/10; H04W 92/24
See application file for complete search history.

(56) References Cited

U.S. PATENT DOCUMENTS

| | | | |
|---|---|---|---|
| 2015/0271861 A1* | 9/2015 | Li | H04W 56/001 455/426.1 |
| 2016/0295624 A1* | 10/2016 | Novlan | H04W 72/04 |
| 2017/0026937 A1 | 1/2017 | Sunghoon et al. | |
| 2017/0195995 A1* | 7/2017 | Zhu | H04W 72/04 |

FOREIGN PATENT DOCUMENTS

| | | | | |
|---|---|---|---|---|
| WO | 2016048082 A1 | 3/2016 | | |
| WO | WO-2016048407 A1 * | 3/2016 | ............ | H04W 72/02 |
| WO | 2016064232 A | 4/2016 | | |
| WO | 2016089115 A1 | 6/2016 | | |

OTHER PUBLICATIONS

Vice-Chairwoman (Interdigital), Report from LTE Break-Out Session (V2V, V2X, FeD2D, LATRED), R2-164420, 3GPP TSG-RAN WG2 Meeting #94, Nanjing, China, May 23-27, 2016.

NTT DOCOMO, Inc., Necessity signaling between eNB and UE for PC5 based V2V, R1-163177, 3GPP TSG RAN WG1 Meeting #84bis, Busan, Korea, Apr. 11-15, 2016.

Huawei, et al., Mode 2 resource allocation for D2D, R1-142839, 3GPP TSG RAN WG1 Meeting #78, Dresden, Germany, Aug. 18-22, 2014.

Ericsson, et al., Sidelink Resource Allocation in V2X, Tdoc R2-164105, 3GPP TSG-RAN WG2 #94, Nanjing, P.R. China, May 23-27, 2016.

Intel Corporation (Rapporteur), Report of email discussion [93bis#25] Mobility for V2V, 3GPP TSG-RAN WG2#94 R2-163620, Nanjing, China, May 23-27, 2016.

Catt, Mobiity Enhancements for LTE-Uu Based V2X, 3GPP TSG RAN WG2 Meeting #94 R2-163420, Nanjing, China, May 23-27, 2016.

* cited by examiner

SYSTEMS AND METHODS FOR RESOURCE SENSING FOR SIDELINK OPERATION

PRIORITY

This application is a 371 of International Application No. PCT/IB2017/054872, filed Aug. 9, 2017, which claims priority to International Application No. PCT/CN2016/094209, filed Aug. 9, 2016, the disclosures of which are fully incorporated herein by reference.

TECHNICAL FIELD

The present disclosure relates, in general, to wireless communications and, more particularly, systems and methods for resource sensing for sidelink operation.

BACKGROUND

In Release 12, the LTE standard has been extended to support device-to-device (D2D) (specified as "sidelink") features targeting both commercial and Public Safety applications. Some applications enabled by Rel-12 LTE include device discovery. Device discovery allows a wireless device to sense the proximity of another device and associated application by broadcasting and detecting discovery messages that carry device and application identities. Another application consists of direct communication based on physical channels established directly between devices. In 3GPP, all of these applications are defined under the umbrella of Proximity Services (ProSe).

One of the potential extensions of the ProSe framework consists of support of V2x communication, which includes any combination of direct communication between vehicles, pedestrians, and infrastructure. FIG. 1 illustrates example types of V2X communication. From the application point of view, V2X includes at least the following types of communication/services: vehicle to vehicle (V2V), vehicle to infrastructure (V2I), vehicle to pedestrian (V2P), and vehicle to network (V2N).

V2V covers communication between vehicles using V2V applications and is predominantly broadcast-based. V2V may be realized by either direct communication between the devices in the respective vehicles, or via infrastructure such as a cellular network. An example of V2V is the transmission of a cooperative awareness message (CAM) with vehicle status information (such as position, direction and speed), which may be periodically and repeatedly transmitted to other vehicles in the proximity. For example, CAM may be transmitted every 100 ms-1 s. Another example is the transmission of a decentralized environmental notification message (DENM), which is an event-triggered message to alert vehicles. These two examples are taken from the ETSI Intelligent Transport Systems (ITS) specification of V2X applications, which also specifies the conditions under which the messages are generated. A main characteristic of V2V applications is the tight requirements on latency that can vary from 20 ms for pre-crash warning messages to 100 ms for other road safety services.

V2I includes communication between vehicles and a Roadside Unit (RSU). An RSU is a stationary transportation infrastructure entity which communicates with vehicles in its proximity. An example of V2I is the transmission of speed notifications from the RSU to vehicles. Other examples include the transmission of queue information, collision risk alerts, and curve speed warnings. Due to the safety related nature of V2I, delay requirements for V2I are similar to the requirements for V2V.

V2P includes communication between vehicles and vulnerable road users, such as pedestrians, using V2P applications. V2P typically takes place between distinct vehicles and pedestrians either directly or via infrastructure such as cellular network.

V2N includes communication between a vehicle and a centralized application server or an ITS Traffic Management Center. Such communications may use V2N applications via infrastructure such as a cellular network. One example is a bad road condition warning sent to all vehicles in a wide area. Another example is a traffic flow optimization in which a V2N application suggests speeds to vehicles and coordinates traffic lights. Thus, V2N messages may be controlled by a centralized entity such as, for example, the Traffic Management Center and may be provisioned to vehicles in a large geographical area, rather than in a small area. Additionally, unlike V2V/V2I, latency requirements for V2N are more relaxed because V2N is meant to be used for non-safety purposes. For example, a is latency requirement is typically considered for V2N.

V2x communication may take advantage of network infrastructure when available. However, at least basic V2x connectivity should be possible even where there is a lack of network coverage. Providing an LTE-based V2x interface may be economically advantageous because of the LTE economies of scale. Additionally, a V2X interface may enable tighter integration for vehicle to infrastructure (V2I), vehicle to pedestrian (V2P), and vehicle to vehicle (V2V) communications, as compared to using a dedicated V2x technology. There are many research projects and field tests of connected vehicles in various countries or regions, including projects that are based on the use of existing cellular infrastructure.

V2x communications may carry both non-safety and safety information, where each of the applications and services may be associated with specific requirements sets. Such requirement sets, for example, may relate to latency, reliability, capacity, or other suitable requirements.

Sidelink transmissions, which may also be known as D2D or ProSe, are communicated over the so-called PC5 interface in cellular spectrum. Sidelink transmissions have been standardized in 3GPP since Release 12. Specifically, two different operative modes have been specified in 3GPP Release 12. In one mode (mode-1), a wireless device in RRC_CONNECTED mode requests D2D resources and the eNB grants them via PDCCH (DCI5) or via dedicated signalling. In another mode (mode-2), a wireless device autonomously selects resources for transmission from a pool of available resources that the eNB provides in broadcast via SIB signalling for transmissions on carriers other than the PCell or via dedicated signaling for transmission on the PCell. Therefore, unlike the first operation mode, the second operation mode can be performed also by wireless devices in RRC_IDLE.

In Release 14, the usage of sidelink is extended to the V2x domain. The design of the sidelink physical layer in Release 12 has been dictated by the assumptions of few amount of wireless devices competing for the same physical resources in the spectrum, to carry voice packet for MCPTT traffic, and low-mobility. On the other hand, in V2x the sidelink should be able to cope with higher load scenario. For example, hundreds of cars could potentially contend for physical resources. In V2X, the sidelink carries time/event triggered V2x messages (CAM, DNEM) and provide high mobility. For such reasons, 3GPP has discussed possible enhancements to the sidelink physical layer.

One such enhancement is the introduction of channel sensing. Unlike random resource selection, which is the basis for Release 12 and Release 13 ProSe communications, in V2V, wireless devices continuously sense the channel and search for resources in the different parts of the spectrum that are less interfered. The objective of such sensing is to limit collisions between wireless devices.

Two types of sensing have been considered in 3GPP. The first type is sensing based on received power. Specifically, a wireless device measures the received energy on specific radio resources. Based on these measurements, the wireless device may decide whether the radio resources are considered to be in use by some other wireless device (i.e., 'busy') or not (i.e., 'idle'). As another example, the wireless device may use the measurements to estimate whether the transmitter is far away or nearby. For example, the transmitter may be far away if the signal is weak and nearby if the signal is strong.

The second type of sensing is sensing based on packet contents. Using this type of sensing, a wireless device receives a packet and decodes it. Based on the information extracted from the packet, the wireless device may obtain some knowledge about the utilization of radio resources: For example, by reading a scheduling assignment (SA) packet or receiving sidelink control information (SCI), a wireless device may know in which radio resources to expect data transmissions and what the priority level of the transmitter is. As another example, by reading a data packet, a wireless device may know the position of the transmitter, the ID of transmitter, the type of transmitter, or some other information about the transmitter.

Wireless device mobility can be supported for wireless devices that are using sidelink resources. When such a wireless device is handed over, the sidelink resources with which it has been configured by its serving cell can be included by the source eNB in its "RRC context," may be signalled to the target eNB in the X2 HANDOVER REQUEST message. The RRC context may be defined as RRC Context IE by 3GPP TS 36.423 and TS 36.331. If the target cell is able to allocate the same set of radio resources to the wireless device, the wireless device may be prevented from losing the PC5 connection, thereby minimizing sidelink service disruption, if any, due to handover.

The ProSe protocol also defines techniques to minimize the impact of radio link failures (RLF). During RLF, the wireless device may temporarily lose connection towards the cell to which it is connected. This may be particularly detrimental if the wireless device has been configured with sidelink mode-1 operations, since the wireless device during RLF cannot receive new sidelink grants from the eNB. Therefore, for the whole duration of an A3 event as defined in TS 36.311, the wireless device may not be able to use the sidelink. This may be highly undesired for mission critical applications. To alleviate this problem, a new pool, which may be referred to as exceptional pool in 3GPP specifications, has been introduced. Such a pool is provided by the eNB in broadcast signalling and should be used when the wireless device enters RLF, so that sidelink service interruption at RLF is minimized. This pool may also be used during an RRC re-establishment stage when T301 is active. The exceptional pool may not be limited to RLF applications only. Instead, they may also be used at handover, for example, to reduce the service interruption.

The nature of V2X traffic calls for more accurate resource selection strategies, other than purely random selection as specified in Release 12 ProSe communications. One such strategy is sensing in which the wireless device is required to first sense the medium and measure the quality of the channel before transmitting. Resource selection may take into account such sensing by prioritizing the selection of those physical resources that were judged to be less interfered. In order to be really effective, such a sensing procedure should be performed for a certain amount of time in the order of hundreds of milliseconds or even seconds. As such, there is an impact on service interruption that might not be negligible. In order to mitigate such a problem, the Release 14 sidelink design considers that the communication pool is continuously sensed by the wireless device. However, continuous sensing may not be possible in case of exceptional pool usage.

Since the exceptional pool is used only in exceptional cases such as, for example, RLF to minimize service interruption, the sensing procedure, which may take some seconds, may be detrimental for mission critical services. For example, the sensing procedure may be detrimental for V2V traffic safety services. Additionally, by the time the wireless device has completed the sensing of the exceptional pool (possibly some seconds), the RLF event may already be terminated, neutralizing the benefit of RLF.

SUMMARY

To address the foregoing problems with existing solutions, disclosed is systems and methods for resource sensing for sidelink operation.

According to certain embodiments, a method by a wireless device is provided for resource sensing. The method includes acquiring, from a network node, an indication of resources associated with a first resource pool. The first resource pool is for use in an exceptional communication with another device. A triggering event associated with signalling from the network node is identified. Based on the triggering event, a need for the exceptional communication with the other device is determined. At least one resource is selected from the first resource pool, and a message is transmitted using the at least one resource selected from the first resource pool.

According to certain embodiments, a wireless device is provided for resource sensing. The wireless device includes non-transitory computer readable media comprising instructions and processing circuitry configured to execute the instructions to cause the wireless device to acquire, from a network node, an indication of resources associated with a first resource pool. The first resource pool is for use in an exceptional communication with another device. A triggering event associated with signalling from the network node is identified. Based on the triggering event, a need for the exceptional communication with the other device is determined. At least one resource is selected from the first resource pool, and a message is transmitted using the at least one resource selected from the first resource pool.

Certain embodiments of the present disclosure may provide one or more technical advantages. For example, certain embodiments may remove service interruption due to sensing operation when a wireless device begins using radio resources belonging to a specific set of radio resources. Such radio resources may include a set of resources to be used only in an exceptional case, such as handover, RLF, loss of synchronization, or another exceptional case.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
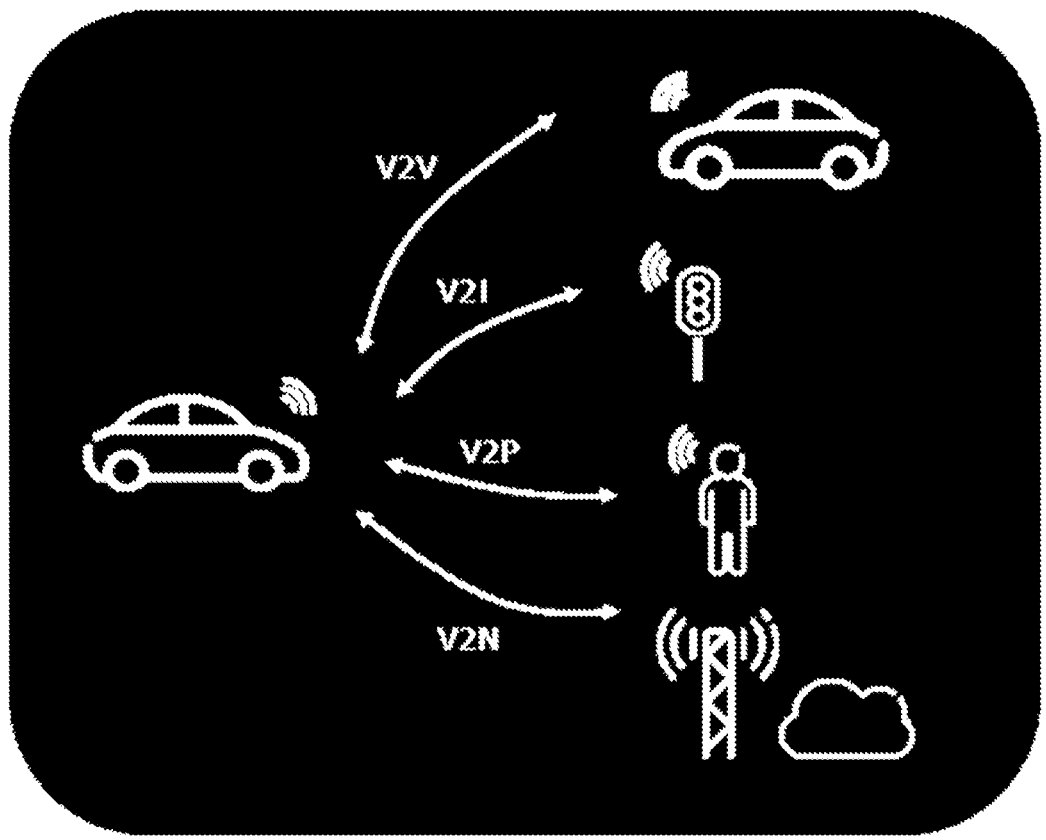
FIG. 1 illustrates example types of V2X communication.

Some of the embodiments contemplated herein will now be described more fully hereinafter with reference to the accompanying drawings. For example, particular embodiments are described in FIGS. 1-13 of the drawings, like numerals being used for like and corresponding parts of the various drawings. Other embodiments, however, are contained within the scope of this disclosure and the invention should not be construed as limited to only the embodiments set forth herein; rather, these embodiments are provided by way of example to convey the scope of the inventive concept to those skilled in the art. Like numbers refer to like elements throughout the description.

According to certain embodiments, methods and systems are proposed for sensing a specific radio resource, or set of resources, while minimizing service interruption due to the associated sensing procedure. Though the systems and methods are described in the context of providing V2X/ITS services over a mobile wireless network using sidelink, the systems and methods may be equally applied in other contexts, such as any traffic with similar characteristics and to any radio access including 5G/NR.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Illustrative examples for resource sensing for sidelink operation will now be described. For purposes of simplicity, the examples will include references to the optional features as numbered below:

1. According to certain embodiments, a set of events may trigger sensing of the radio environment by the wireless device, where the radio environment may be a set of specific physical radio resources such as, for example, a pool of resources. The set of radio resources may be provided by the network node in dedicated signalling such as, for example, a handover command. In other embodiments, the set of radio resources may be provided via broadcasting signalling or preconfigured in the wireless device. Such physical radio resources may be a set of radio resources belonging to a pool B different from the pool A currently used by the wireless device. For example, in a particular embodiment, resources of pool B may consist of:
   exceptional resources to be used, unlike resources of pool A, under certain conditions such as, for example, handover, RLF, out-of-sync, out-of-coverage, or other conditions;
   a set of resources that are selected for better quality than the resources of pool A such as, for example, for higher reference signal received power (RSRP), less congestion, etc.;
   a set of resources to be used in a certain geographical areas (e.g. zones in which the wireless device is currently located) which may be identified by geographical coordinates or by zone identities or by radio coverage.
2. According to certain embodiments, a set of events may trigger a release of the sensing of the radio environment by the wireless device;
3. According to certain embodiments, the wireless device using one example autonomous radio resource selection protocol may be required to complete at least one sensing period in order to select resources;
4. According to certain embodiments, the wireless device using another example autonomous radio resource selection protocol may not be required to have completed at least one sensing period in order to select resources;
5. According to certain embodiments using a centralized radio resource selection protocol, a third scheduler node may control the transmission of the wireless device;

6. According to certain embodiments, a set of conditions may be provided for determining whether sufficient sensing has been accomplished by the wireless device in order to perform autonomous resource selection.

In a first example embodiment, a wireless device performs the following steps:

Initiating sensing of the radio environment upon detection of one of the trigger conditions in (1).

Determining that an autonomous radio resource selection is needed by the wireless device in order to perform a transmission. This could be (but is not necessarily) the consequence of the wireless device switching from centralized resource selection (5) to autonomous resource selection based on procedures associated to so called "exceptional case." For example, it could be triggered by counters associated by RLF, in the case of loss of connection to the network during a handover, or simply in response to the wireless device changing the sidelink transmitting pool from pool A to pool B.

Determining whether condition (6) is fulfilled.

If condition (6) is fulfilled, performing autonomous radio resource selection according to (4).

Optionally, interrupting the sensing operation once the triggers in (2) are fulfilled.

In another example embodiment, the wireless device may perform the steps above. However, if condition (6) is not fulfilled, the wireless device may avoid transmission until condition (6) is fulfilled. After condition (6) is performed, the wireless device may perform autonomous radio resource selection according to (3).

In another example, embodiment, if condition (6) is not fulfilled, the wireless device may perform autonomous radio resource selection according to (4) until condition (6) is fulfilled. Once condition (6) is fulfilled, the wireless device may perform autonomous radio resource selection according to (3).

According to certain embodiments, various events may trigger the sensing of the radio environment. Examples of such events may include, for example, the configuration of mode-1 (NW/eNB-controlled scheduling) operation in the wireless device by higher layers. Another example event may include the transmission of sidelinkUEInformation to the network node to request mode-1 resources. Still another example event may include the reception of a grant (e.g. a sidelink grant on PDCCH or RRC) from the wireless device that allows the usage of the radio resources. Yet another example event may include a measurement report to the network node such as, for example, upon event (3), discussed above. This can address the case in which the wireless device needs to perform a handover. Still other examples of events may include one or more out-of-sync indications detected by the wireless device, detection of RLF, reception at the wireless device of signalling associated with a handover command, an event that triggers the change of transmitting pool from pool A to pool B such as, for example, where pool B has better RSRP than pool A or pool A is less congested than pool B, the detection of out-of-coverage, and UE location. For example, an event may be triggered where a wireless device moves from a geographical area or zone associated with pool A to another geographical area or zone associated with pool B. In this case, the sensing of resources of pool B may be initiated when the wireless device is located less than a certain configurable distance apart from the border or from the centre of the geographical area or zone associated with pool B.

According to certain embodiments, such triggering events ensure that the battery consumption of the wireless device is limited since the sensing of the radio environment is only performed upon triggering of the above events. In other embodiments, the wireless device may simply start sensing the radio environment upon detecting the presence of certain physical resources such as, for example, exceptional pools, in dedicated or broadcasting signalling, without necessarily waiting for the triggering of the above events.

The sensing procedure and related parameters such as the duration of the sensing procedure, the resources to monitor, and/or other parameters may be different for different triggering events and for different radio environments. For simplicity, in the following embodiments and examples, it may be considered the case in which pool A is a normal communication pool and pool B is an exceptional pool. However, the below embodiments can be generalized to the case in which both pool A and pool B are normal communication pools to be used under different radio conditions such as, for example, on the basis of the RSRP, congestion, handover, RLF, out-of-sync, out-of-coverage, or other conditions.

According to certain embodiments, different rules to terminate the sensing procedure can be envisaged. For example, according to a particular embodiment, for the exceptional pool (i.e. pool B) or while performing exceptional transmissions or non-normal transmissions or communications, in general, the network node may configure a shorter sensing duration than for the normal communication pool (i.e. pool A) and transmissions in order to limit the service interruption. Possible sensing duration values may range from 0s (i.e. no sensing performed) to a maximum value. In another embodiment, the sensing may be performed until certain events occur.

In a particular embodiment, for example, one such option is timer-based sensing. With timer-based sensing, sensing may be initiated by a certain event such as any of those discussed herein, and sensing may be terminated at the expiration of a configured timer. Possible sensing duration values may range from 0s (i.e. no sensing performed) to a maximum value. In a particular embodiment, new sensing can be performed if one of the events is triggered. In another embodiment, the sensing timer may be restarted.

According to certain embodiments, the maximum value may be different for different events. For example, if the sensing of the radio environment (i.e., exceptional resource pool) is initiated after RLF, the maximum value can be smaller than T311, which is the maximum duration of RLF before the wireless device goes to idle. Where, for example, the sensing of radio environment relates to an exceptional pool used for handover, the maximum value may vary if sensing is initiated after the triggering of the measurement report (e.g. some seconds) or after reception of handover command (e.g. the maximum value can be smaller than T304, which is the maximum duration of handover procedure before the wireless device initiates connection reestablishment).

In another example embodiment, the sensing procedure may be initiated by any of the events listed herein and then stopped after a certain event is triggered. According to certain embodiments, for example, where the event that triggered sensing is a measurement report, the sensing may last until the handover is acknowledged by the network. Upon reception of a handover command, the wireless device may begin transmitting on the most appropriate sensed resources if the radio environment is sensed free. If the handover command is not received within a certain time, transmission over the sensed radio environment may not be performed and sensing may be aborted until a new event triggers sensing of the radio environment. In a particular embodiment, for example, the sensing may last for the whole duration of the sensing period, or until a certain amount of reports have been sent by the wireless device.

In yet another example embodiment, where the event that triggered sensing is the detection of one or more out-of-sync indications by the wireless device, the transmission over the sensed radio environments may be initiated if N310 out-of-sync occasions are detected and T310 is started. If T310 is not started, the sensing may be terminated and no transmission may be attempted over the sensed radio environment. For example, the sensing may be terminated if one or more in-sync indications are received by lower layers.

In still another example embodiment, where the event that triggered sensing is the UE location, the sensing of the resource pool associated with a certain geographical area or zone may last until the wireless device is located within a certain geographical area or zone, or within a certain distance from such geographical area or zone. The transmission over the sensed radio environment associated with the geographical area or zone may be initiated when the wireless device enters the geographical area or zone and is terminated when the wireless device leaves the geographical area or zone.

In yet another embodiment, the wireless device may be configured to skip the sensing of the radio environment and perform random selection of radio resources within a pool. For instance, if the sensing duration is set to 0s, the wireless device may perform random selection of radio resources. No sensing of the radio environment may be done for resource selection.

According to another embodiment, if in the same pool, there is a mixture of resource selection mechanisms such as, for example, both random selection and resource selection according to sensing are allowed, the sensing performances might be impaired. Therefore, in a particular embodiment, pools where random selection is allowed and pools where sensing is allowed may not be overlapping. In another particular embodiment, if on some resources both random selection and resource selection according to sensing are allowed, the result of sensing over those resources may be offset by a certain value. For example, the result may be offset by a percentage of the sensing result in order to account for the possibility that those resources might be occasionally interfered by random selection.

According to yet another embodiment, a wireless device may both perform random selection and sensing once one of the above triggering events has occurred. For example, random selection may be performed until the sensing procedure is completed. This implies, for example, that the timer for sensing described above expires. Once sensing is completed, the resource selection is performed according to the sensing procedure rather than randomly. Therefore, in this example embodiment, the wireless device may be required to transmit on the basis of randomly selected transmitting radio resources while at the same time performing sensing on a specific set of radio resources that can be or not be the same as the one used for random selection.

According to certain embodiments, the relevant sensing parameters may be provided as part of the exceptional/communication pool configuration provided by the network node in broadcast or dedicated signalling.

Figure 2:
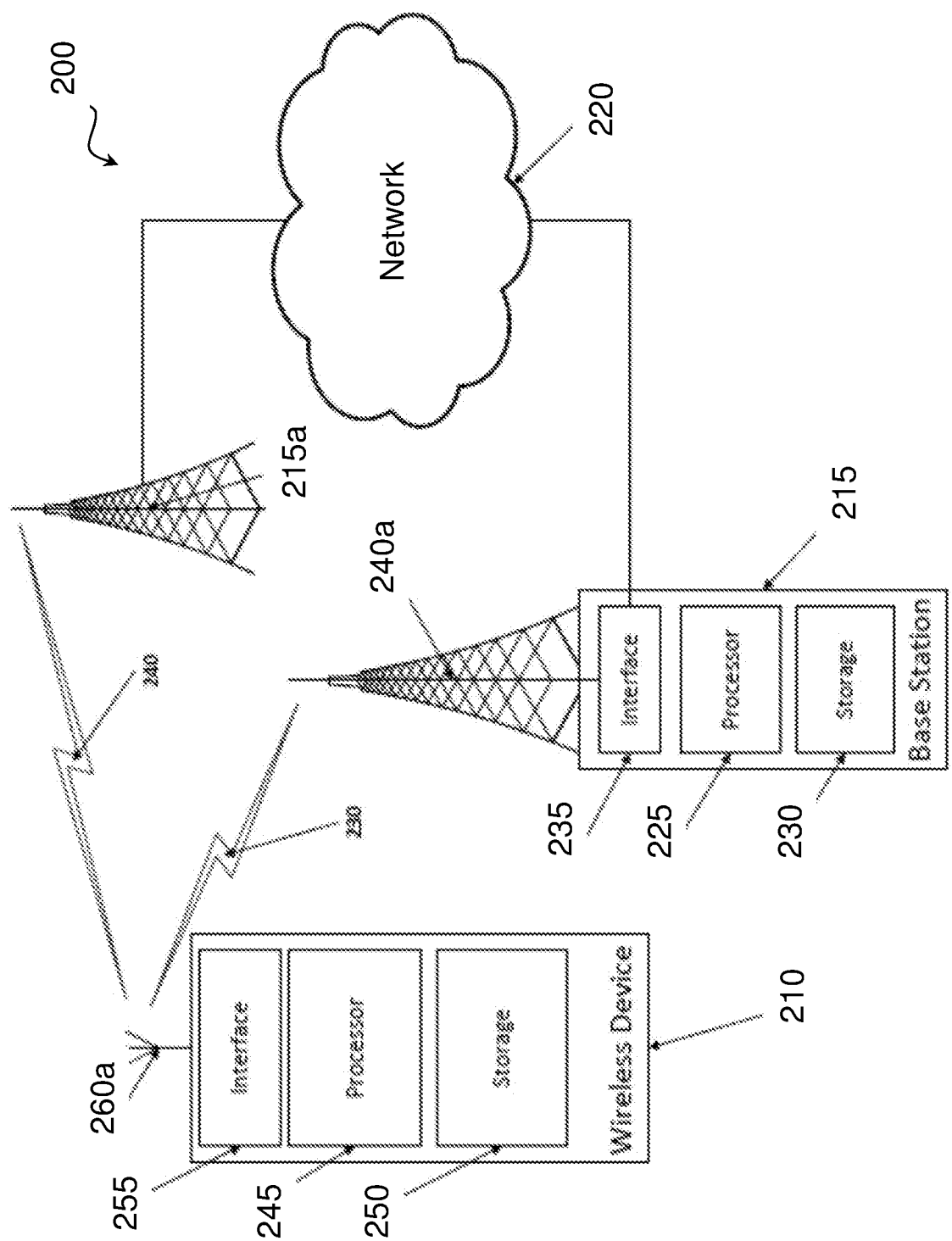
FIG. 2 illustrates an exemplary network for resource sensing for sidelink operation, according to certain embodiments.

Although the solutions described herein may be implemented in any appropriate type of system using any suitable components, particular embodiments of the described solutions may be implemented in a wireless communication network such as the example wireless communication network 200 illustrated in FIG. 2. In the example embodiment of FIG. 2, the wireless communication network 200 provides communication and other types of services to one or more wireless devices 210. In the illustrated embodiment, the wireless communication network 200 includes one or more instances of network nodes 215 and 215a that facilitate the wireless devices' access to and/or use of the services provided by the wireless communication network 200. For simplicity, FIG. 2 only depicts network 220, network nodes 215 and 215a, and wireless device 210. However it is recognized that wireless communication network 200 may include any number of networks, network nodes, and wireless devices. Additionally, wireless communication network 200 may include any additional elements suitable to support communication between wireless devices 210 or between a wireless device 210 and another communication device, such as a landline telephone.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices. According to certain embodiments, wireless network 200 may communicate wireless signals between wireless devices 210 or between a wireless device 210 and another communication device, such as network node 215. The wireless signals may contain voice traffic, data traffic, control signals, and/or any other suitable information. In some embodiments, an area of wireless signal coverage associated with a network node 215 may be referred to as a cell. In some embodiments, wireless devices 110 may have D2D capability. Thus, wireless devices 210 may be able to receive signals from and/or transmit signals directly to another wireless device 210.

The wireless communication network 200 may represent any type of communication, telecommunication, data, cellular, and/or radio network or other type of system. Although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U Universal Mobile Telecommunications System (UMTS), HSPA, Global System for Mobile Communications (GSM), cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

In particular embodiments, wireless communication network 200 may be configured to operate according to specific standards or other types of predefined rules or procedures. Thus, particular embodiments of the wireless communication network 200 may implement communication standards, such as GSM, UMTS, LTE, and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards. The communication network may also support D2D or ProSe communication.

According to certain embodiments, network node 215 comprises a processor 225, storage 230, interface 235, and antenna 240a. Similarly, wireless device 210 comprises processor 245, storage 250, interface 255 and antenna 260a. These components may work together in order to provide network node 215 and/or wireless device 210 functionality, such as providing wireless connections in wireless communication network 200. In different embodiments, the wireless communication network 200 may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a wireless device 210 and/or with other equipment in the wireless communication network 200 that enable and/or provide wireless access to the wireless device 210. Examples of network nodes 215 include, but are not limited to, access points (APs), in particular radio access points. A network node may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS). As a particular non-limiting example, a base station may be a relay node or a relay donor node controlling a relay.

Further examples of network nodes 215 include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes 215 may represent any suitable device (or group of devices) capable, configured, arranged, and/or operable to enable and/or provide a wireless device 210 access to the wireless communication network 200 or to provide some service to a wireless device 210 that has accessed the wireless communication network 200.

As used herein, the term "radio node" is used generically to refer to both wireless devices 210 and network nodes 215, as each is respectively described above.

As depicted in FIG. 2, network node 215 includes a processor 225, storage 230, interface 235, and antenna 240a. These components are depicted as single boxes located within a single larger box. In practice however, a network node 215 may comprise multiple different physical components that make up a single illustrated component (e.g., interface 235 may comprise terminals for coupling wires for a wired connection and a radio transceiver for a wireless connection). As another example, network node 215 may be a virtual network node in which multiple different physically separate components interact to provide the functionality of network node 215. For example, processor 225 may comprise three separate processors located in three separate enclosures, where each processor is responsible for a different function for a particular instance of network node 215. Similarly, network node 215 may be composed of multiple physically separate components (e.g., a NodeB component and a RNC component, a BTS component and a BSC component, etc.), which may each have their own respective processor, storage, and interface components. In certain scenarios in which network node 215 includes multiple separate components (e.g., BTS and BSC components), one or more of the separate components may be shared among several network nodes 215. For example, a single RNC may control multiple NodeB's. In such a scenario, each unique NodeB and BSC pair, may be a separate network node 215. In some embodiments, network node 215 may be configured to support multiple radio access technologies (RATs). In some embodiments, some components may be duplicated. For example, network node 215 may include separate storage 203 for the different RATs. Likewise, in some embodiments, some components may be reused. For example, the same antenna 240a may be shared by the RATs.

Processor 225 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 215 components, such as storage 230, network node 215 functionality. For example, processor 225 may execute instructions stored in storage 230. Such functionality may include providing various wireless features discussed herein to a wireless device, such as wireless device 210, including any of the features or benefits disclosed herein.

Storage 230 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 230 may store any suitable instructions, data or information, including software and encoded logic, utilized by network node 215. Storage 230 may be used to store any calculations made by processor 225 and/or any data received via interface 235.

Interface 235 may be used in the wired or wireless communication of signalling and/or data between network node 215, network 220, and/or wireless device 210. For example, interface 235 may perform any formatting, coding, or translating that may be needed to allow network node 215 to send and receive data from network 220 over a wired connection. Interface 235 may also include a radio transmitter and/or receiver that may be coupled to or a part of antenna 240a. The radio may receive digital data that is to be sent out to other network nodes 215 or wireless devices 210 via a wireless connection. The radio may convert the digital data into a radio signal having the appropriate channel and bandwidth parameters. The radio signal may then be transmitted via antenna 240a to the appropriate recipients such as, for example, wireless device 210.

Antenna 240a may be any type of antenna capable of transmitting and receiving data and/or signals wirelessly. In some embodiments, antenna 240a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" refers to a device capable, configured, arranged and/or operable to communicate wirelessly with network nodes 215 and/or another wireless device 210. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network 220 on a predetermined schedule, when triggered by an internal or external event, or in response to requests from the network 220.

Generally, a wireless device 210 may represent any device capable of, configured for, arranged for, and/or operable for wireless communication, for example radio communication devices. Examples of wireless devices 210 include, but are not limited to, a wireless endpoint, mobile station, mobile phone, wireless local loop phone, smartphone, user equipment, desktop computer, a PDA (Personal Digital Assistant), cell phone, tablet, laptop, VoIP phone or handset, which is able to wirelessly send and receive data and/or signals to and from a network node, such as network node 215 and/or other wireless devices 210. Further examples include sensors, modems, wireless cameras, wireless-enabled tablet computers, machine-type-communication (MTC) devices/machine-to-machine (M2M) devices, laptop-embedded equipment (LEE), laptop-mounted equipment (LME), USB dongles, wireless customer-premises equipment (CPE), D2D capable devices, or another device that can provide wireless communication.

A wireless device 210 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. In a particular example embodiment, wireless device 210 may be configured for communication in accordance with one or more communication standards promulgated by the $3^{rd}$ Generation Partnership Project (3GPP), such as 3GPP's GSM, UMTS, LTE, and/or 5G standards. As used herein, a "user equipment" or "WD" may not necessarily have a "user" in the sense of a human user who owns and/or operates the relevant device. Instead, a wireless device 210 may represent a device that is intended for sale to, or operation by, a human user but that may not initially be associated with a specific human user.

The wireless device 210 may support device-to-device (D2D) communication, for example by implementing a 3GPP standard for sidelink communication, and may in this case be referred to as a D2D communication device.

As yet another specific example, in an Internet of Things (TOT) scenario, a wireless device 210 may represent a machine or other device that performs monitoring and/or measurements, and transmits the results of such monitoring and/or measurements to another wireless device 210 and/or a network node 215. The wireless device 210 may in this case be a machine-to-machine (M2M) device, which may in a 3GPP context be referred to as a machine-type communication (MTC) device. As one particular example, the wireless device 210 may be a wireless device implementing the 3GPP narrow band internet of things (NB-IoT) standard. Particular examples of such machines or devices are sensors, metering devices such as power meters, industrial machinery, or home or personal appliances such as, for example, refrigerators, televisions, personal wearables such as watches, and other devices. In other scenarios, a wireless device 210 may represent a vehicle or other equipment that is capable of monitoring and/or reporting on its operational status or other functions associated with its operation.

A wireless device 210 as described above may represent the endpoint of a wireless connection, in which case the device may be referred to as a wireless terminal. Furthermore, a wireless device 210 as described above may be mobile, in which case it may also be referred to as a mobile device or a mobile terminal.

According to certain embodiments, and as illustrated in FIG. 2, wireless device 210 includes processor 245, storage 250, interface 255, and antenna 260a. Like network node 215, the components of wireless device 210 are depicted as single boxes located within a single larger box, however in practice a wireless device 210 may comprises multiple different physical components that make up a single illustrated component. For example, storage 250 may include multiple discrete microchips, and each microchip may represent a portion of the total storage capacity.

Processor 245 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 210 components, such as storage 2250, wireless device 210 functionality. Such functionality may include providing various wireless features discussed herein, including any of the features or benefits disclosed herein.

Storage 250 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 250 may store any suitable data, instructions, or information, including software and encoded logic, utilized by wireless device 210. Storage 250 may be used to store any calculations made by processor 245 and/or any data received via interface 255.

Interface 255 may be used in the wireless communication of signalling and/or data between wireless device 210 and network node 215. For example, interface 255 may perform any formatting, coding, or translating that may be needed to allow wireless device 210 to send and receive data from network node 215 over a wireless connection. Interface 255 may also include a radio transmitter and/or receiver that may be coupled to or a part of antenna 260a. The radio may receive digital data that is to be sent out to network node 215 via a wireless connection. The radio may convert the digital data into a radio signal having the appropriate channel and bandwidth parameters. The radio signal may then be transmitted via antenna 260a to network node 215.

Antenna 260a may be any type of antenna capable of transmitting and receiving data and/or signals wirelessly. In some embodiments, antenna 260a may comprise one or more omni-directional, sector or panel antennas operable to transmit/receive radio signals between 2 GHz and 66 GHz. In certain alternative embodiments, wireless device 210 may not include antenna 260a. Instead, antenna 260a may be separate from wireless device 210 and be connectable to wireless device 210 through an interface or port. For simplicity, antenna 260a may be considered a part of interface 255 to the extent that a wireless signal is being used.

In certain embodiments, network nodes 215 may interface with a radio network controller (not depicted in FIG. 2). The radio network controller may control network nodes 215 and may provide certain radio resource management functions, mobility management functions, and/or other suitable functions. In certain embodiments, the functions of the radio network controller may be included in network node 215. The radio network controller may interface with a core network node. In certain embodiments, the radio network controller may interface with the core network node via an interconnecting network, such as network 220.

In some embodiments, the core network node may manage the establishment of communication sessions and various other functionalities for wireless devices 210. Wireless devices 210 may exchange certain signals with the core network node using the non-access stratum layer. In non-access stratum signaling, signals between wireless devices 210 and the core network node may be transparently passed through the radio access network. In certain embodiments, network nodes 215 may interface with one or more network nodes over an internode interface. For example, network nodes 215 and 215A may interface over an X2 interface.

Figure 3:
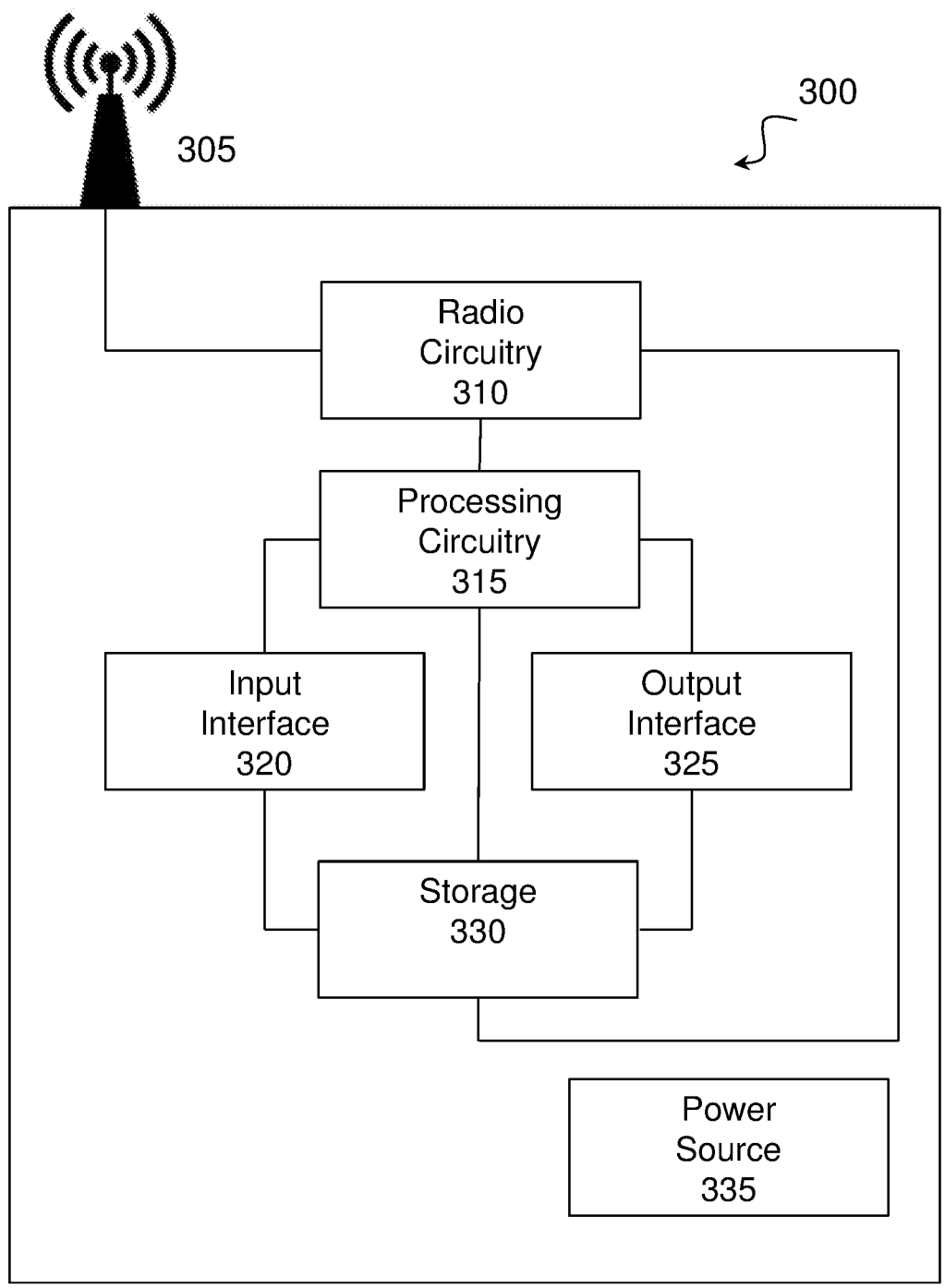
FIG. 3 illustrates another exemplary wireless device for resource sensing for sidelink operation in accordance with certain embodiments.

FIG. 3 illustrates another exemplary wireless device 300 for resource sensing for sidelink operation, according to certain embodiments. In a particular embodiment, wireless device 300 is a UE. Wireless device 300 includes an antenna 305, radio front-end circuitry 310, processing circuitry 315, and storage 330, which may include a computer-readable storage medium 330.

Antenna 305 may include one or more antennas or antenna arrays and is configured to send and/or receive wireless signals. Antenna 305 is connected to radio front-end circuitry 310. In certain embodiments, wireless device 300 may not include antenna 305. Additionally or alternatively, antenna 305 may be separate from wireless device 300 and be connectable to wireless device 300 through an interface or port.

Radio front-end circuitry 310 may include various filters and amplifiers, is connected to antenna 305 and processing circuitry 315, and is configured to condition signals communicated between antenna 305 and processing circuitry 315. In certain alternative embodiments, wireless device 300 may not include radio front-end circuitry 310. Processing circuitry 315 may instead be connected to antenna 305 without radio front-end circuitry 310.

Processing circuitry 315 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In particular embodiments, part or all of the baseband processing circuitry and application processing circuitry may be combined into one chipset, and the RF transceiver circuitry may be on a separate chipset. In still other embodiments, part or all of the RF transceiver circuitry and baseband processing circuitry may be on the same chipset, and the application processing circuitry may be on a separate chipset. In yet other embodiments, part or all of the RF transceiver circuitry, baseband processing circuitry, and application processing circuitry may be combined in the same chipset. Processing circuitry 315 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 315 executing instructions stored on storage 330, which may include a computer-readable storage medium. In particular embodiments, some or all of the functionality may be provided by the processing circuitry 315 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 315 alone or to other components of wireless device 300, but are enjoyed by the wireless device as a whole, and/or by end users and the wireless network generally.

Antenna 305, radio front-end circuitry 310, and/or processing circuitry 315 may be configured to perform any receiving operations described herein as being performed by a wireless device. Any information, data and/or signals may be received from a network node and/or another wireless device.

The processing circuitry 315 may be configured to perform any determining operations described herein as being performed by a wireless device. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination.

Antenna 305, radio front-end circuitry 310, and/or processing circuitry 315 may be configured to perform any transmitting operations described herein as being performed by a wireless device. Any information, data and/or signals may be transmitted to a network node and/or another wireless device.

Storage 330, which may include a computer-readable storage medium, is generally operable to store instructions, such as a computer program, software, an application including one or more of logic, rules, code, tables, etc. and/or other instructions capable of being executed by a processor. Examples of storage 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 315. In some embodiments, processing circuitry 315 and storage 330 may be considered to be integrated.

Wireless device 300 may include input interfaces, devices and circuits, and output interfaces, devices and circuits. Input interfaces, devices, and circuits are configured to allow input of information into wireless device 300 and are connected to processing circuitry 315 to allow processing circuitry 315 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from wireless device 300 and are connected to processing circuitry 315 to allow processing circuitry 315 to output information from wireless device 300. For example, output interfaces, devices, or circuits may include a speaker, a display, vibrating circuitry, a USB port, a headphone interface, or other output elements. Using one or more input and output interfaces, devices, and circuits, wireless device 300 may communicate with end users and/or the wireless network, and allow them to benefit from the functionality described herein.

Wireless device 300 may include power source 335. Power source 335 may comprise power management circuitry. Power source 335 may receive power from a power supply, which may either be comprised in, or be external to, power source 335. For example, wireless device 300 may comprise a power supply in the form of a battery or battery pack which is connected to, or integrated in, power source 335. Other types of power sources, such as photovoltaic devices, may also be used. As a further example, wireless device 300 may be connectable to an external power supply (such as an electricity outlet) via an input circuitry or interface such as an electrical cable, whereby the external power supply supplies power to power source 335. Power source 335 may be connected to radio front-end circuitry 310, processing circuitry 315, and/or storage 330 and be configured to supply wireless device 300, including processing circuitry 315, with power for performing the functionality described herein.

Alternative embodiments of wireless device 300 may include additional components beyond those shown in FIG. 3 that may be responsible for providing certain aspects of the wireless device's functionality, including any of the functionality described herein and/or any functionality necessary to support the solution described above. Wireless device 300 may also include multiple sets of processing circuitry 315, storage 330, radio circuitry 310, and/or antenna 305 for different wireless technologies integrated into wireless device 300, such as, for example, GSM, WCDMA, LTE, NR, WiFi, or Bluetooth wireless technologies. These wireless technologies may be integrated into the same or different chipsets and other components within wireless device 300.

Other embodiments of wireless device 300 may include additional components beyond those shown in FIG. 3 that may be responsible for providing certain aspects of the wireless device's functionality, including any of the functionality described above and/or any additional functionality (including any functionality necessary to support the solution described above).

Figure 4:
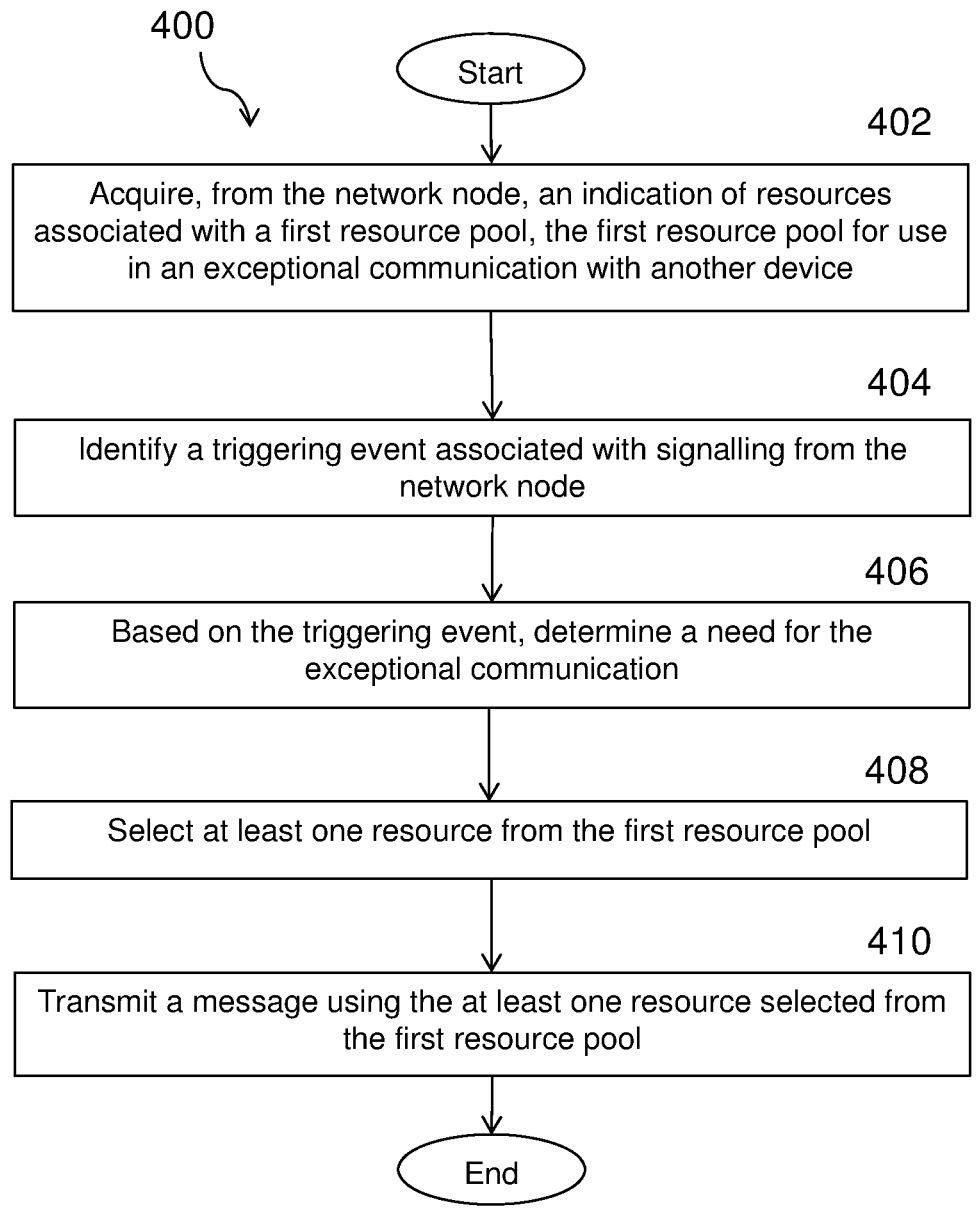
FIG. 4 illustrates an exemplary method by a wireless device for resource sensing for sidelink operation, according to certain embodiments.

FIG. 4 illustrates an exemplary method 400 by a wireless device for resource sensing for sidelink operation, according to certain embodiments. The method begins at step 402 when a wireless device such as wireless device 300, acquires from the network node an indication of resources associated with a first resource pool. The indication may be acquired via a system information block or dedicated signalling, in various embodiments. According to certain embodiments, the first resource pool is for use in non-normal communication.

According to a particular embodiment, wireless device 300 may also acquire an indication of resources associated with a second resource pool for use in normal communication with the other device. Wireless device 300 may select resources from the second resource pool during normal communication with the other device. In a particular embodiment, the first resource pool may include a first plurality of resources that are a subset of a second plurality of resources in the first resource pool.

At step 404, wireless device 300 identifies a triggering event associated with signalling from the network node. According to certain embodiments, wireless device 300 may stop using the second resource pool for normal communications in response to identifying the triggering event.

According to certain embodiments, identifying the triggering event may include detecting a change in the communication session. In a particular embodiment, for example, identifying the triggering event may include identifying that control of the wireless device is to be handed over to a second network node. As another example, the triggering event may include a failure of a communication or a failure of signalling from the network node. As still another example, in a particular embodiment, identifying the triggering event may include determining that the first resource pool has a better RSRP than a second resource pool that is used for normal communication. In another embodiment, identifying the triggering event may include determining that the first resource pool is less congested than the second resource pool.

At step 406, wireless device 300 determines, based on the triggering event, a need for the exceptional communication. In a particular embodiment, for example, the wireless device may determine that control of the wireless device 300 is to be handed over from the first network node to a second network node.

At step 408, the wireless device 300 selects at least one resource from the first resource pool. In a particular embodiment, wireless device 300 may sense the resources in at least one of the first resource pool and the second resource pool. If the sensing of the resources is completed, the at least one resource may be selected based on the sensing. However, if the sensing of the resources is not completed or is unsuccessful, wireless device 300 may randomly select the at least resource from the first resource pool. Sensing may be deemed incomplete or unsuccessful when wireless device 300 does not have time to complete sensing a resource is needed. Additionally, sensing should be completed for a predetermined amount of time before the sensing results may be used for resource selection. As such, sensing may be deemed incomplete or unsuccessful when the sensing has not been completed for at least one second.

Upon completing the sensing of the first resource pool or upon expiry of a timer, wireless device 300 may stop randomly selecting resources from the first resource pool. Where the sensing of the resources of the first resource pool has been completed, wireless device 300 may begin selecting resources from the first resource pool based on the sensing. In a particular embodiment, for example, wireless device 300 may select at least a second resource from the first resource pool based on the completed sensing.

According to certain embodiments, wireless device 300 may receive an eNodeB-scheduled resource configuration message from a network node and perform sensing of the resources in response to the eNodeB-scheduled resource configuration message. In a particular embodiment, for example, wireless device 300 may receive a configuration message specifying the use of mode-1 operation, and the resources of the first resource pool may be sensed while wireless device 300 is operating in mode-1. In another example embodiment, wireless device 300 may receive a configuration message specifying the use of mode-3 operation, and the resources of the first resource pool may be sensed while wireless device 300 is operating in mode-3.

At step 410, the wireless device transmits a message using the at least one resource selected from the first resource pool.

Figure 5:
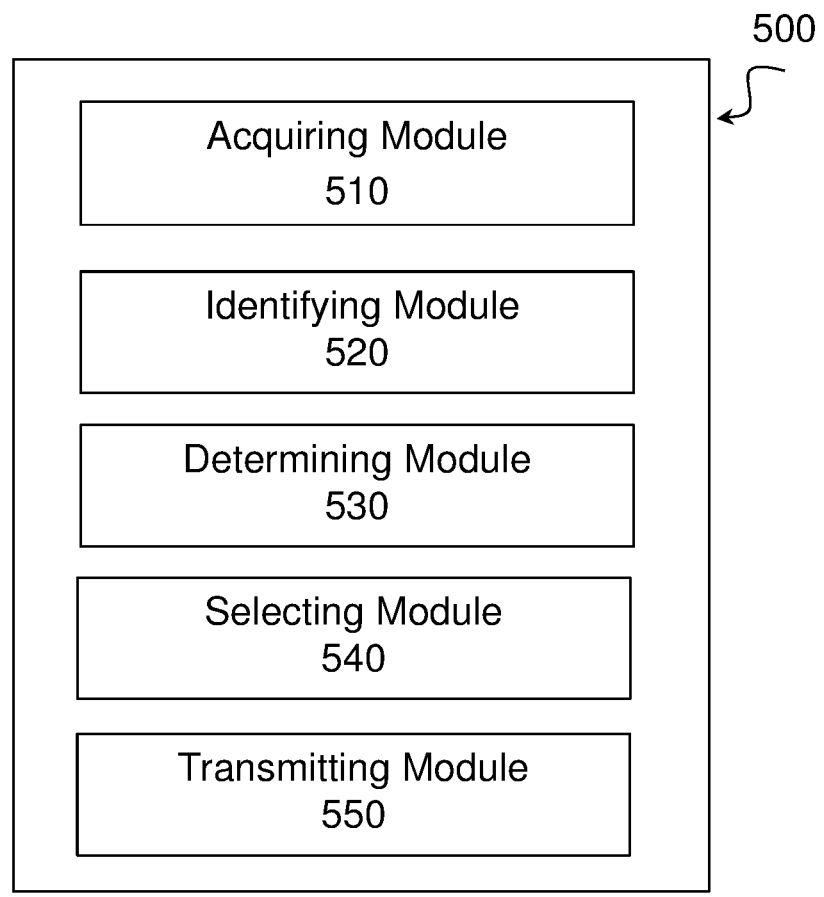
FIG. 5 illustrates another exemplary virtual computing device for resource sensing for sidelink operation, according to certain embodiments.

In certain embodiments, the method for resource sensing for sidelink operation as described above may be performed by a virtual computing device. FIG. 5 illustrates an example virtual computing device 500 for resource sensing for sidelink operation, according to certain embodiments. In certain embodiments, virtual computing device 500 may include modules for performing steps similar to those described above with regard to the method illustrated and described in FIG. 4. For example, virtual computing device 500 may include an acquiring module 510, an identifying module 520, a determining module 530, a selecting module 540, a transmitting module 550, and any other suitable modules for resource sensing for sidelink operation. In some embodiments, one or more of the modules may be implemented using processing circuitry 315 of FIG. 3. In certain embodiments, the functions of two or more of the various modules may be combined into a single module.

The acquiring module 510 may perform the acquiring functions of virtual computing device 500. For example, in a particular embodiment, acquiring module 510 may acquire, from the network node, an indication of resources associated with a first resource pool. According to certain embodiments, the first resource pool may be for use in exceptional communication.

The identifying module 520 may perform the identifying functions of virtual computing device 500. For example, in a particular embodiment, identifying module 520 may identify a triggering event associated with signalling from the network node. In a particular embodiment, identifying module 520 may identify that control of wireless device 300 is being handed over from a first network node to a second network.

The determining module 530 may perform the determining functions of virtual computing device 500. For example, in a particular embodiment, determining module 530 may, based on the triggering event, determine a need for the exceptional communication.

The selecting module 540 may perform the selecting functions of virtual computing device 500. For example, in a particular embodiment, selecting module 540 may select a resource from the first resource pool. In a particular embodiment, selecting module 540 may randomly select a resource from the first resource pool while sensing of the resources of the first resource pool or other additional resources is performed.

The transmitting module 550 may perform the transmitting functions of virtual computing device 500. For example, in a particular embodiment, transmitting module 550 may transmits a message using the selected resource from the first resource pool.

Other embodiments of virtual computing device 500 may include additional components beyond those shown in FIG. 5 that may be responsible for providing certain aspects of the wireless device's functionality, including any of the functionality described above and/or any additional functionality (including any functionality necessary to support the solutions described above). The various different types of wireless devices may include components having the same physical hardware but configured (e.g., via programming) to support different radio access technologies, or may represent partly or entirely different physical components.

Figure 6:
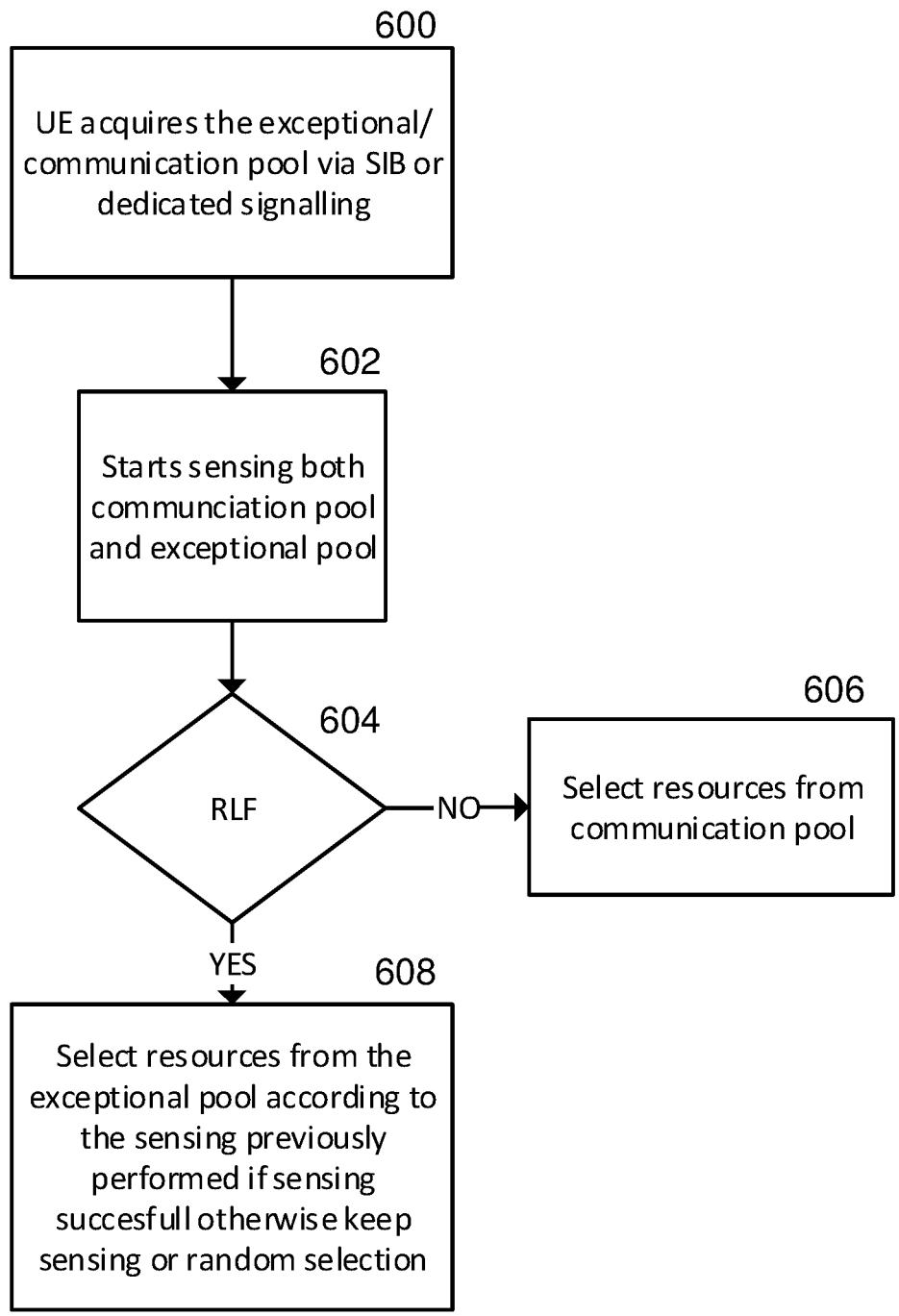
FIG. 6 illustrates another example method for resource sensing for sidelink operation, according to certain embodiments.

FIG. 6 illustrates another example method for resource sensing for sidelink operation, according to certain embodiments. In the example embodiment, it may be considered that the radio environment corresponds to a set of exceptional resources to be used in exceptional cases. For example, the exceptional resources may be used in the case of RLF, handover or the loss of synchronization towards synchronization reference (e.g., GPS, UE, eNB).

The procedure as illustrated in FIG. 6 begins at step 600 when the wireless device 300 acquires the exceptional/communication pool via SIB or dedicated signalling. At step 602, wireless device 300 starts sensing of both the communication pool and the exceptional pool. At step 604, wireless device 300 determines if an exceptional event such as RLF or handover has occurred. Where the event has not occurred, wireless device 300 selects resources from the communication pool at step 606. Conversely, where the event has occurred, wireless device 300 selects resources from the exceptional pool according to the sensing previously performed, if sensing was successful. Otherwise, wireless device 300 keeps sensing or performs random selection.

Therefore, in the example embodiment, wireless device 300 is required to perform sensing of exceptional pool (i.e. pool B) and possibly of the regular communication pools (i.e. pool A). In the case of an exceptional event such as RLF or handover, the wireless device 300 can select the most appropriate resources from the exceptional pool without any further sensing procedure.

Figure 7:
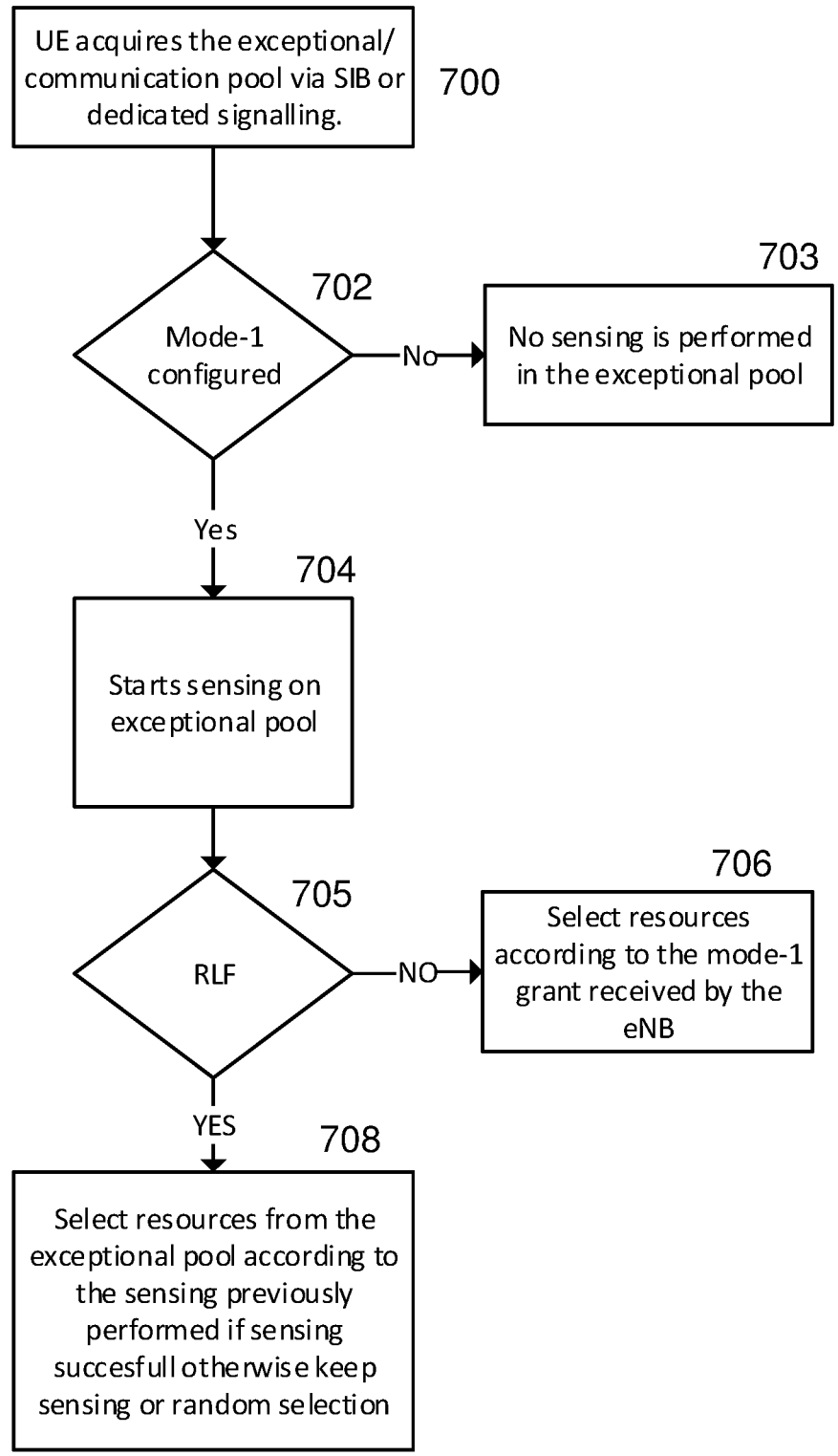
FIG. 7 illustrates another example method for resource sensing for sidelink operation, according to certain embodiments.

FIG. 7 illustrates another example method for resource sensing for sidelink operation, according to certain embodiments. In the example embodiment, it may be again considered that the radio environment corresponds to a set of exceptional resources to be used in exceptional cases. For example, the exceptional resources may be used in the case of RLF, handover or the loss of synchronization towards synchronization reference (e.g., GPS, UE, eNB).

The procedure as illustrated in FIG. 7 begins at step 700 when wireless device 300 acquires the exceptional/communication pool via SIB or dedicated signalling. At step 702, wireless device 300 determines if the wireless device is received a mode-1 sensing grant from the network node. If the wireless device is not configured for mode-1 sensing, the method continues to step 704 and no sensing is performed in the exceptional pool. However, if wireless device 300 is configured for mode-1 sensing, wireless device 300 starts sensing on the exceptional pool at step 706. At step 708, wireless device 300 determines if an exceptional event such as RLF or handover has occurred. Where the event has not occurred, wireless device 300 selects resources according to the mode-1 grant received by the network node at step 710. Conversely, where the event has occurred, the wireless device 300 selects resources from the exceptional pool according to the sensing previously performed, if sensing was successful. Otherwise, wireless device 300 keeps sensing or performs random selection.

Therefore, in the example embodiment, the exceptional pool is only sensed when wireless device 300 is configured with mode-1 operations by higher layers. In a particular embodiment, for example, wireless device 300 may start sensing the exceptional pool upon initiating transmission of sidelinkUEInformation to the network node to request mode-1 resources. In another embodiment, the wireless device may start sensing the exceptional pool upon reception of a mode-1 sidelink grant.

Figure 8:
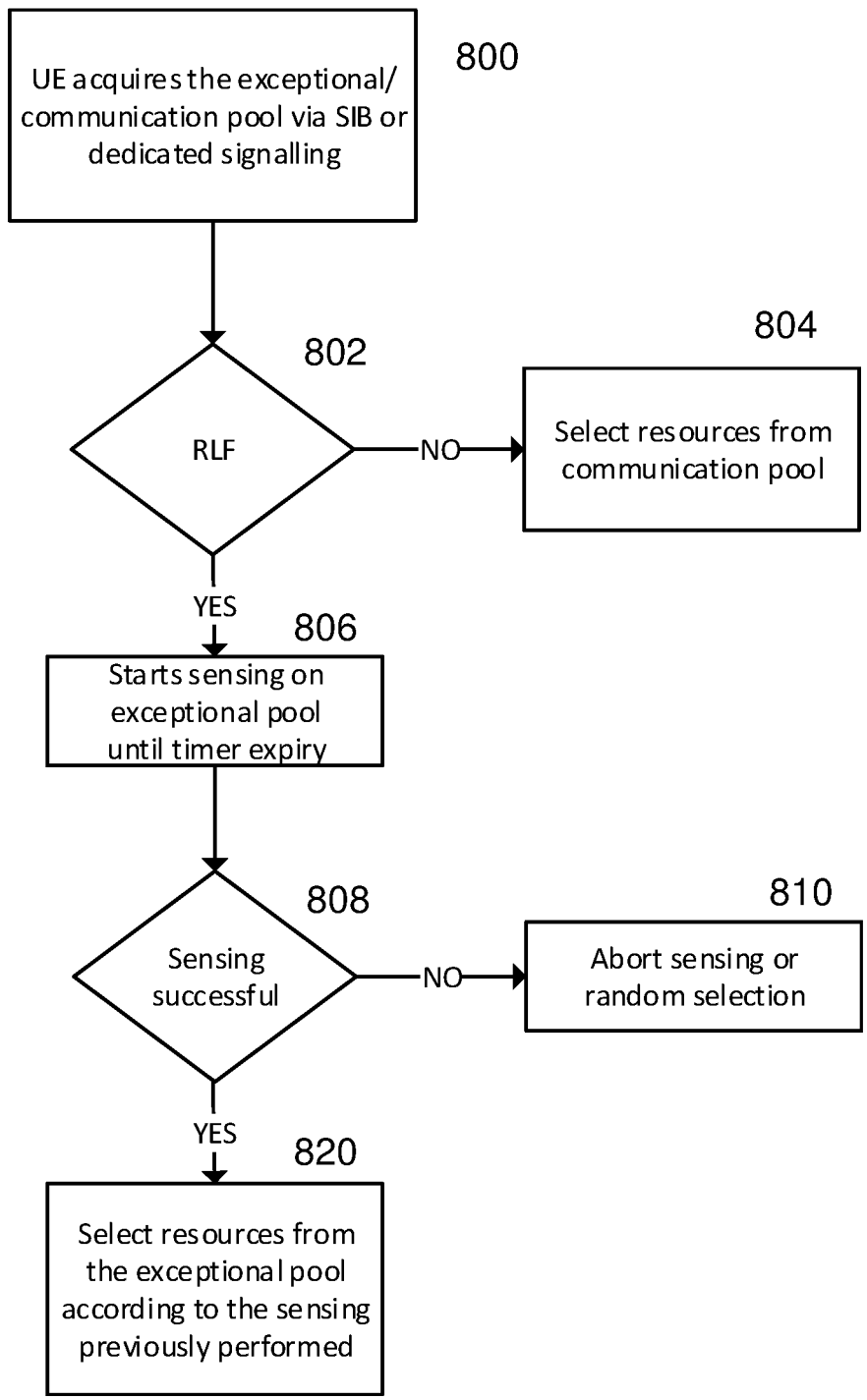
FIG. 8 illustrates another example method for resource sensing for sidelink operation, according to certain embodiments.

FIG. 8 illustrates another example method for resource sensing for sidelink operation, according to certain embodiments. In the example embodiment, it may be again considered that the radio environment corresponds to a set of exceptional resources to be used in exceptional cases. For example, the exceptional resources may be used in the case of RLF, handover or the loss of synchronization towards synchronization reference (e.g., GPS, UE, eNB).

The procedure as illustrated in FIG. 8 begins at step 800 when wireless device 300 acquires the exceptional/communication pool via SIB or dedicated signalling. At step 802, the wireless device 300 determines if an exceptional event such as RLF or handover has occurred. Where the event has not occurred, wireless device 300 selects resources from the communication pool at step 804. Conversely, where the event has occurred, wireless device 300 starts sensing on the exceptional pool at step 806. At step 808, a determination is made as to whether sensing was successful. If sensing was not successful, wireless device 300 aborts sensing or performs random selection at step 810. If sensing was successful, however, wireless device 300 selects resources from the exceptional pool according to the sensing previously performed.

Therefore, according to this embodiment, the exceptional pool is sensed only upon a certain event such as RLF or handover being declared, and the sensing should last for a certain configured time. In case of handover, for example, the exceptional pool to be sensed can be provided by dedicated signalling via a handover command. In a variant of this example, wireless device 300 may perform transmission on randomly selected resources, while performing sensing on the same or another set of specific radio resources. When sensing is completed such as when a timer expires, the resources are selected according to the completed sensing procedure rather than randomly.

Figure 9:
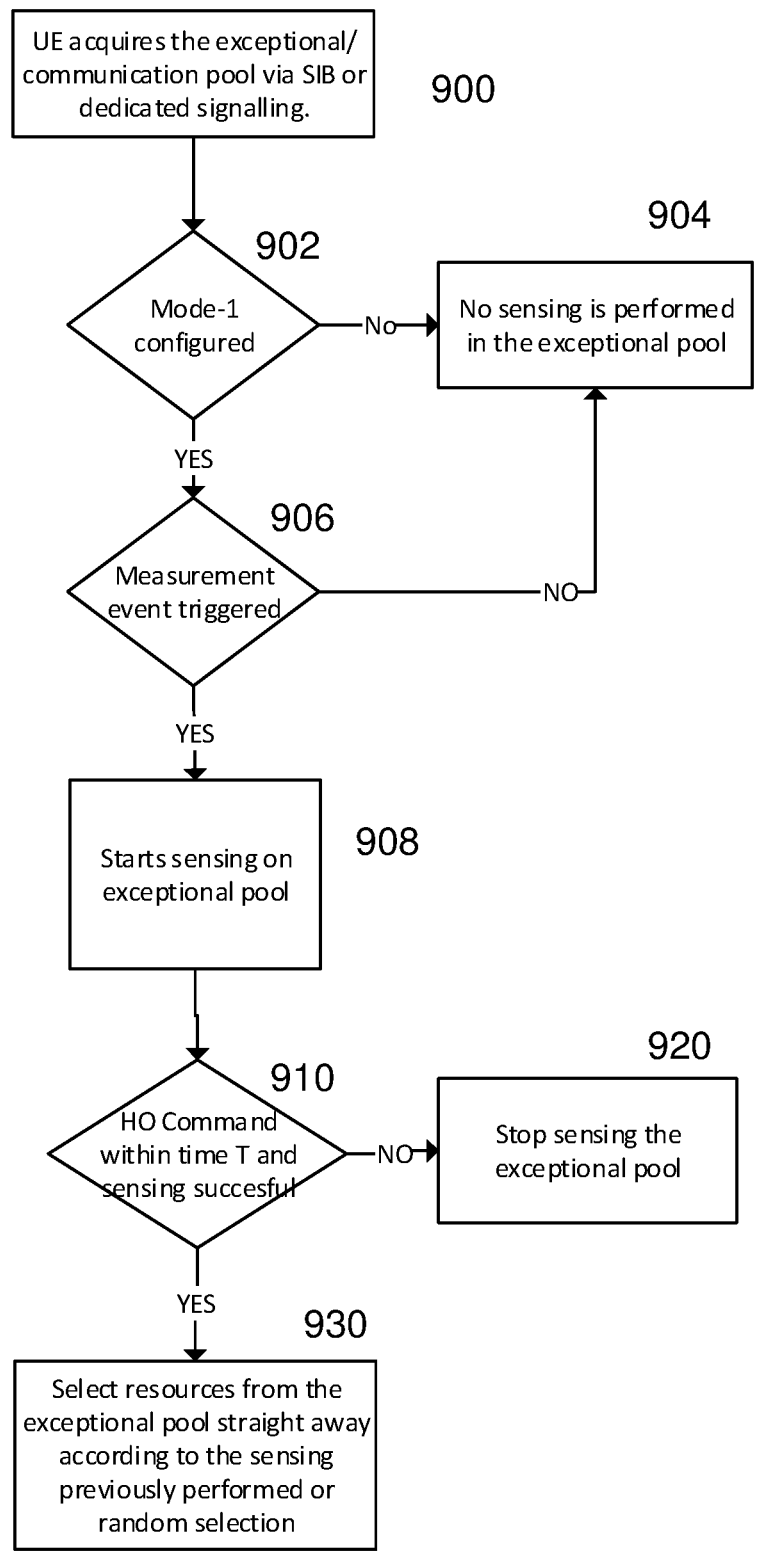
FIG. 9 illustrates another example method for resource sensing for sidelink operation, according to certain embodiments.

FIG. 9 illustrates another example method for resource sensing for sidelink operation, according to certain embodiments. In the example embodiment, it may be again considered that the radio environment corresponds to a set of exceptional resources to be used in exceptional cases. For example, the exceptional resources may be used in the case of RLF, handover or the loss of synchronization towards synchronization reference (e.g., GPS, UE, eNB).

The procedure as illustrated in FIG. 9 begins at step 900 when wireless device 300 acquires the exceptional/communication pool via SIB or dedicated signalling. At step 902, wireless device 300 determines if the wireless device has received a mode-1 sensing grant from the network node. If wireless device 300 is not configured for mode-1 sensing, the method continues to step 904 and no sensing is performed in the exceptional pool. However, if wireless device 300 is configured for mode-1 sensing, wireless device 300 determines if a measurement event has been triggered, at step 906. If the measurement event has not been triggered, the method returns to step 904 and no sensing is performed in the exceptional pool. Conversely, if a measurement event has been triggered, the method continues to step 908, and wireless device 300 starts sensing on the exceptional pool. At step 910, wireless device 300 determines if a handover command has been received prior to the expiration of a timer and if sensing was successful. If not, wireless device 300 stops sensing of the exceptional pool at step 912. Conversely, where the handover command was received and the sensing was successful, wireless device 300 selects resources from the exceptional pool according to the sensing previously performed or wireless device 300 performs random selection.

Therefore, according to this embodiment, wireless device 300 starts sensing the exceptional pool upon triggering an event, and it lasts until another event is triggered. In FIG. 9, sensing is triggered by the measurement report and the stopped upon reception of the handover command. If no handover command is received, the sensing is aborted until a new event is triggered.

Figure 10:
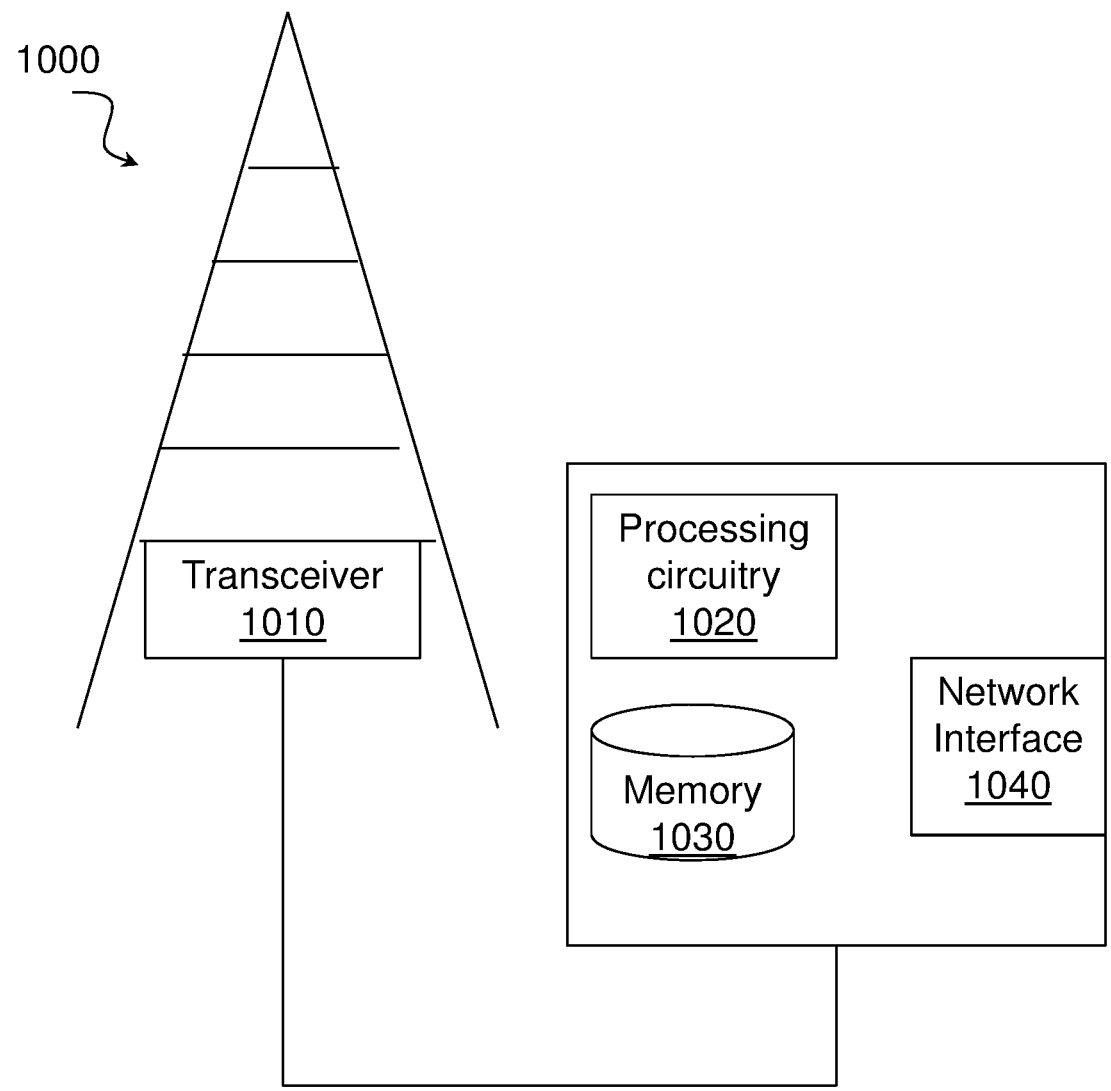
FIG. 10 illustrate another example network node for providing resource information for resource sensing for sidelink operation, according to certain embodiments.

FIG. 10 illustrate another example network node 1000 for resource sensing for sidelink operation, according to certain embodiments. As described above, network node 1000 may be any type of radio network node or any network node that communicates with a wireless device and/or with another network node. Examples of a network node 1000 may include those provided above with respect to network node 215.

Network node 1000 may be deployed throughout network as a homogenous deployment, heterogeneous deployment, or mixed deployment. A homogeneous deployment may generally describe a deployment made up of the same (or similar) type of network nodes 1000 and/or similar coverage and cell sizes and inter-site distances. A heterogeneous deployment may generally describe deployments using a variety of types of network nodes 1000 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 1000 may include one or more of transceiver 1010, processing circuitry 1020, memory 1030, and network interface 1040. In some embodiments, transceiver 1010 facilitates transmitting wireless signals to and receiving wireless signals from wireless device 1010 (e.g., via an antenna), processing circuitry 1020 executes instructions to provide some or all of the functionality described above as being provided by a network node, memory 1030 stores the instructions executed by processor 1020, and network interface 1040 communicates signals to backend network components, such as a gateway, switch, router, Internet, Public Switched Telephone Network (PSTN), core network nodes or radio network controllers, etc.

In certain embodiments, network node 1000 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processing circuitry 1020 may include any suitable combination of hardware and software implemented in one or more modules to execute instructions and manipulate data to perform some or all of the described functions of network node 1000. In some embodiments, processing circuitry 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for network node 1000, send output from network node 1000, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of network node 1000 may include additional components beyond those shown in FIG. 10 that may be responsible for providing certain aspects of the radio network node's functionality, including any of the functionality described above and/or any additional functionality (including any functionality necessary to support the solutions described herein). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 11:
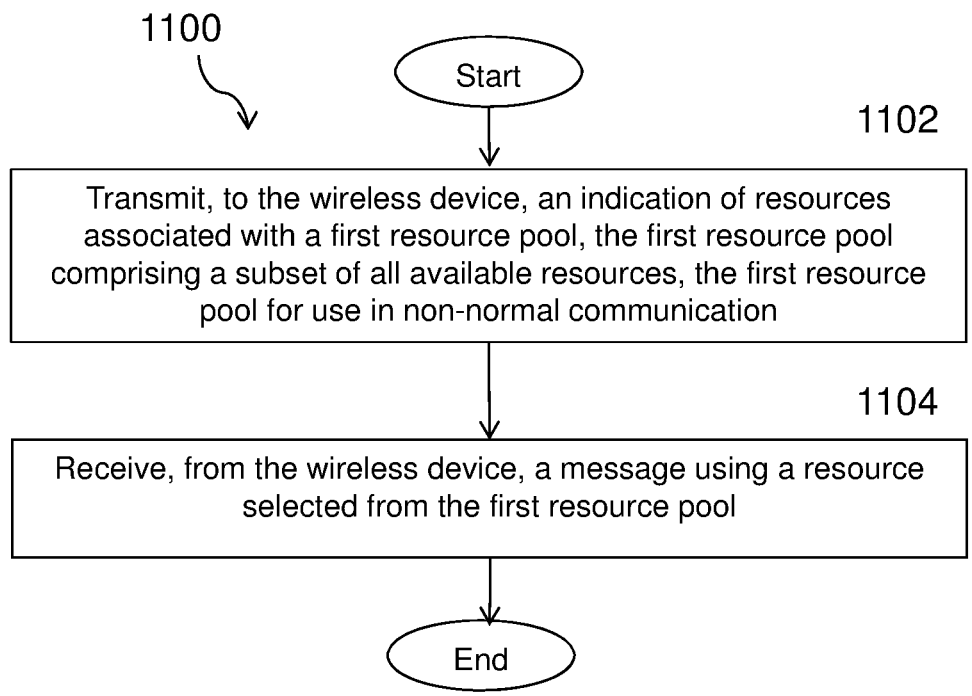
FIG. 11 illustrates an example method by a network node for providing resource information for resource sensing for sidelink operation, according to certain embodiments.

FIG. 11 illustrates an example method 1100 by a network node 215, 1000 for providing resources for resource sensing for sidelink operation, according to certain embodiments. The method begins at step 1102 when the network node transmits to the wireless device an indication of resources associated with a first resource pool. The first resource pool includes a subset of all available resources and is for use in non-normal communication. In a particular embodiment, the first resource pool is an exceptional resource pool. In particular embodiments, the indication of the resources associated with the first resource pool may be transmitted via a system information block or via dedicated signalling.

In a particular embodiment, the network node may additionally or alternatively transmit, to the wireless device, a configuration message specifying the use of mode-1 operation. The resources of the first resource pool may be sensed by the wireless device while operating in mode-1, according to certain embodiments.

At step 1104, the network node receives from the wireless device a message using a resource selected from the first resource pool. The message may be received in response to a change in the communication session associated with a non-normal communication, as detected by the wireless device. In a particular embodiment, for example, the change in the communication session may include a failure of the communication session. In another example embodiment, the change in the communication session may include a handover of the communication session to a second network node.

Figure 12:
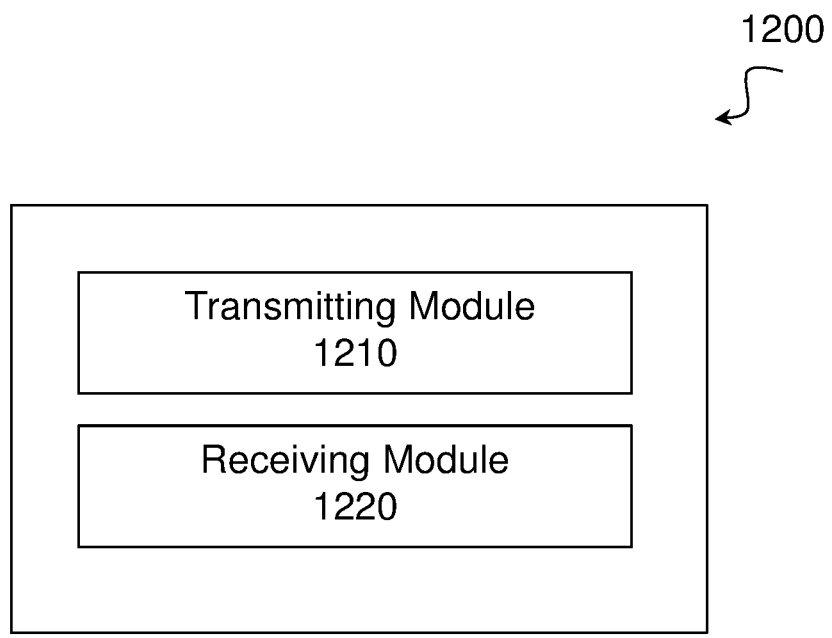
FIG. 12 illustrates an example virtual computing device for resource sensing for sidelink operation, according to certain embodiments.

In certain embodiments, the method for providing resources for resource sensing for sidelink operation as described above may be performed by a virtual computing device. FIG. 12 illustrates an example virtual computing device 1200 for providing resources for resource sensing for sidelink operation, according to certain embodiments. In certain embodiments, virtual computing device 1200 may include modules for performing steps similar to those described above with regard to the method illustrated and described in FIG. 11. For example, virtual computing device 1200 may include a transmitting module 1210, a receiving module 1220, and any other suitable modules for providing resources for resource sensing. In some embodiments, one or more of the modules may be implemented using processing circuitry 1020 of FIG. 10. In certain embodiments, the functions of two or more of the various modules may be combined into a single module.

The transmitting module 1210 may perform the transmitting functions of virtual computing device 1200. For example, in a particular embodiment, transmitting module 1210 may transmit to the wireless device an indication of resources associated with a first resource pool. The first resource pool includes a subset of all available resources and is for use in non-normal communication. In a particular embodiment, the first resource pool is an exceptional resource pool.

The receiving module 1220 may perform the receiving functions of virtual computing device 1200. For example, in a particular embodiment, receiving module 1220 may receive from the wireless device a message using a resource selected from the first resource pool. The message is received in response to a change in the communication session associated with a non-normal communication.

Other embodiments of virtual computing device 1200 may include additional components beyond those shown in FIG. 12 that may be responsible for providing certain aspects of the network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 13:
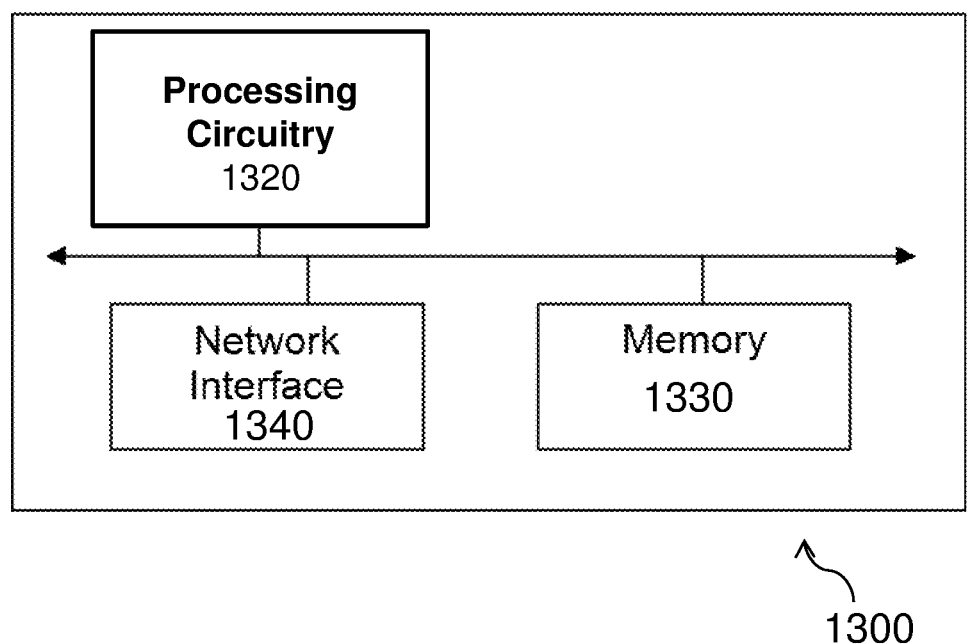
FIG. 13 illustrates an exemplary radio network controller or core network node, in accordance with certain embodiments.

FIG. 13 illustrates an exemplary radio network controller or core network node, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 1300 includes processing circuitry 1320, memory 1330, and network interface 1340. In some embodiments, processing circuitry 1320 executes instructions to provide some or all of the functionality described above as being provided by the network node, memory 1330 stores the instructions executed by processing circuitry 1320, and network interface 1340 communicates signals to any suitable node, such as a gateway, switch, router, Internet, Public Switched Telephone Network (PSTN), network nodes 115, radio network controllers or core network nodes 1300, etc.

Processing circuitry 1320 may include any suitable combination of hardware and software implemented in one or more modules to execute instructions and manipulate data to perform some or all of the described functions of the radio network controller or core network node 1300. In some embodiments, processing circuitry 1320 may include, for example, one or more computers, one or more central processing units (CPUs), one or more microprocessors, one or more applications, and/or other logic.

Memory 1330 is generally operable to store instructions, such as a computer program, software, an application including one or more of logic, rules, algorithms, code, tables, etc. and/or other instructions capable of being executed by a processor. Examples of memory 1330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1340 is communicatively coupled to processing circuitry 1320 and may refer to any suitable device operable to receive input for the network node, send output from the network node, perform suitable processing of the input or output or both, communicate to other devices, or any combination of the preceding. Network interface 1340 may include appropriate hardware (e.g., port, modem, network interface card, etc.) and software, including protocol conversion and data processing capabilities, to communicate through a network.

Other embodiments of the network node may include additional components beyond those shown in FIG. 13 that may be responsible for providing certain aspects of the network node's functionality, including any of the functionality described above and/or any additional functionality (including any functionality necessary to support the solution described above).

According to certain embodiments, a method by a wireless device is provided for resource sensing. The method includes acquiring, from a network node, an indication of resources associated with a first resource pool. The first resource pool is for use in an exceptional communication with another device. A triggering event associated with signalling from the network node is identified. Based on the triggering event, a need for the exceptional communication with the other device is determined. At least one resource is selected from the first resource pool, and a message is transmitted using the at least one resource selected from the first resource pool.

According to certain embodiments, a wireless device is provided for resource sensing. The wireless device includes non-transitory computer readable media comprising instructions and processing circuitry configured to execute the instructions to cause the wireless device to acquire, from a network node, an indication of resources associated with a first resource pool. The first resource pool is for use in an exceptional communication with another device. A triggering event associated with signalling from the network node is identified. Based on the triggering event, a need for the exceptional communication with the other device is determined. At least one resource is selected from the first resource pool, and a message is transmitted using the at least one resource selected from the first resource pool.

According to certain embodiments, a wireless device is configured for resource sensing. The wireless device includes interface circuitry configured to establish a communication session with a network node. The interface circuitry is further configured to acquire an indication of resources associated with a first resource pool from the network node. The first resource pool includes a subset of all available resources, and the first resource pool is for use in non-normal communication. The wireless device further includes processing circuitry configured to determine a change in the communication session. The change indicates a need for non-normal communication. The processing circuitry is further configured to select a resource from the first resource pool, and the interface circuitry is further configured to transmit a message using the selected resource from the first resource pool. The wireless device further includes power supply circuitry configured to supply power to said wireless device.

According to certain embodiments, a UE is configured for resource sensing. The UE includes an antenna configured to send and receive wireless signals and radio front-end circuitry connected to the antenna and to processing circuitry. The radio front-end circuitry is configured to condition signals communicated between the antenna and the processing circuitry. The processing circuitry is configured to establish a communication session with a network node and acquire an indication of resources associated with a first resource pool from the network node. The first resource pool includes a subset of all available resources, and the first resource pool is for use in non-normal communication. The processing circuitry is configured to determine a change in the communication session, where the change indicates a need for non-normal communication, and select a resource from the first resource pool. The processing circuitry is configured to transmit a message using the selected resource from the first resource pool. An input interface is connected to the processing circuitry and is configured to allow input of information into the UE to be processed by the processing circuitry. An output interface is connected to the processing circuitry and is configured to output information from the UE that has been processed by the processing circuitry. A battery connected to the processing circuitry and configured to supply power to the UE.

According to certain embodiments, a wireless device for resource sensing includes a communication module, an acquisition module, a determination module, a selection module, and a transmission module. The communication module is configured to establish a communication session with a network node. The acquisition module is configured to acquire an indication of resources associated with a first resource pool from the network node. The first resource pool includes a subset of all available resources, and the first resource pool is for use in non-normal communication. The determination module is configured to determine a change in the communication session, where the change indicating a need for non-normal communication. The selection module configured to select a resource from the first resource pool, and the transmission module is configured to transmit a message using the selected resource from the first resource pool.

According to certain embodiments, a system for resource sensing includes a network node configured to establish a wireless communication session with a wireless device. The network node is further configured to provide the wireless device with an indication of resources associated with a first resource pool. The first resource pool includes a subset of all available resources, and the first resource pool is for use by the wireless device in non-normal communication. The wireless device is configured to determine a change in the communication session, where the change indicating a need for non-normal communication. The wireless device further is configured to select a resource from the first resource pool and transmit a message using the selected resource from the first resource pool.

Certain embodiments of the present disclosure may provide one or more technical advantages. For example, certain embodiments may remove service interruption due to sensing operation when a wireless device begins using radio resources belonging to a specific set of radio resources. Such radio resources may include a set of resources to be used only in an exceptional case, such as handover, RLF, loss of synchronization, or another exceptional case.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage 230 may comprise computer readable means on which a computer program can be stored. The computer program may include instructions which cause processor 225 (and any operatively coupled entities and devices, such as interface 235 and storage 230) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 225 and/or 245, possibly in cooperation with storage 230 and/or 250. Processors 225 and/or 245 and storage 230 and/or 250 may thus be arranged to allow processors 225 and/or 245 to fetch instructions from storage 230 and/or 250 and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Accordingly, modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

Modifications, additions, or omissions may be made to the methods described herein without departing from the scope of the disclosure. The methods may include more, fewer, or other steps. Additionally, steps may be performed in any suitable order.

Abbreviations used in the preceding description include:
3G Third Generation of Mobile Telecommunications Technology
BSM Basic Safety Message
BW Bandwidth
CAM Cooperative Awareness Message
DPTF Data Packet Transmission Format
D2D Device-to-Device Communication
DENM Decentralized Environmental Notification Message
DSRC Dedicated Short-Range Communications
eNB eNodeB
ETSI European Telecommunications Standards Institute
LTE Long-Term Evolution
NW Network
RA Resource Allocation
RS Reference Signals
TF Transport Format
SAE Society of the Automotive Engineers
UE User Equipment
V2I Vehicle-to-Infrastructure
V2P Vehicle-to-Pedestrian
V2V Vehicle-to-vehicle communication
V2x Vehicle-to-anything-you-can-imagine
wrt with respect to
SPS Semi Persistent Scheduling
DMRS Demodulation reference signals
OCC Orthogonal cover code
HO Handover
SIB System Information Block
RLF Radio Link Failure
3GPP Third Generation Partnership Project
RRC Radio Resource Control
PDCCH Physical Downlink Control Channel
PSS Primary Synchronization Signal
SSS Secondary Synchronization Signal
ProSe Proximity Services
MCPTT Mission Critical Push To Talk
WD Wireless Device
RSRP Reference Signal Received Power

The invention claimed is:

1. A method for resource sensing by a wireless device, the method comprising:
acquiring, from a network node, an indication of resources associated with a first resource pool, the first resource pool for use in an exceptional communication with another device;
acquiring, from the network node, an indication of resources associated with a second resource pool, the second resource pool for use in normal communication with the other device;
identifying, by the wireless device, a triggering event associated with signalling from the network node, wherein identifying the triggering event comprises at least one of the following:
determining that the first resource pool has a better reference signal received power, RSRP, than the second resource pool;
determining that the first resource pool is less congested than the second resource pool;
detecting a handover of the wireless device from the first network node to a second network node;
detecting a change in the communication session; or
detecting a failure of a communication or signaling from the network node;
based on the triggering event determining, by the wireless device, a need for the exceptional communication with the other device;

sensing the availability of resources in at least one of the first resource pool and the second resource pool, wherein the sensing is based on received power or packet contents;

upon successfully completing the sensing of all resources in at least the first resource pool, selecting, by the wireless device, at least one resource from the first resource pool wherein the at least one resource is selected based on the sensing of the resources;

upon unsuccessful or incomplete sensing of all resources in at least the first resource pool randomly selecting at least one resource from the first resource pool; and transmitting, by the wireless device, a message using the at least one resource selected from the first resource pool.

2. The method of claim 1, further comprising:

prior to identifying the triggering event and during normal communication with the other device, selecting at least one resource from the second resource pool; and based on the triggering event, stopping using the second resource pool to begin using the first resource pool for selection of the resource.

3. The method of claim 2, wherein the first resource pool comprises a first plurality of resources that are a subset of a second plurality of resources in the first resource pool.

4. The method of claim 1, further comprising continuing to randomly select resources from the first resource pool until an expiration of a timer.

5. The method of claim 1, further comprising:

receiving, from the network node, an eNodeB-scheduled resource configuration message, and wherein the resources of the at least one of the first resource pool and the second resource pool are sensed in response to the eNodeB-scheduled resource configuration message.

6. The method of claim 1, wherein the indication of the resources associated with the first resource pool is acquired via a system information block.

7. The method of claim 1, wherein the indication of the resources associated with the first resource pool is acquired via dedicated signaling.

8. A wireless device configured for resource sensing, the wireless device comprising:

non-transitory computer readable media comprising instructions; and processing circuitry configured to execute the instructions to cause the wireless device to:

acquire, from a network node, an indication of resources associated with a first resource pool, the first resource pool for use in an exceptional communication with another device;

acquire, from the network node, an indication of resources associated with a second resource pool, the second resource pool for use in normal communication with the other device;

identify a triggering event associated with signalling from the network node, wherein the wireless device identifies the triggering event according to at least one of the following:

the wireless devices determines that the first resource pool has a better reference signal received power, RSRP, than the second resource pool;

the wireless devices determines that the first resource pool is less congested than the second resource pool;

a handover of the wireless device from the first network node to a second network node;

the wireless devices detects a change in the communication session; or the wireless devices detects a failure of a communication or signaling from the network node;

based on the triggering event determining a need for the exceptional communication with the other device;

sense the availability of resources in at least one of the first resource pool and the second resource pool, wherein the sensing is based on received power or packet contents;

upon successfully completing the sensing of all resources in at least the first resource pool, select at least one resource from the first resource pool wherein the at least one resource is selected based on the sensing of the resources;

upon unsuccessful or incomplete sensing of all resources in at least the first resource pool randomly select at least one resource from the first resource pool; and transmit a message using the at least one resource selected from the first resource pool.

9. The wireless device of claim 8, wherein the processing circuitry is further configured to:

prior to identifying the triggering event and during normal communication with the other device, select at least one resource from the second resource pool; and based on the triggering event, stop using the second resource pool to begin using the first resource pool for selection of the resource.

10. The wireless device of claim 9, wherein the first resource pool comprises a plurality of resources that are a subset of a second plurality of resources in the first resource pool.

11. The wireless device of claim 8, wherein the processing circuitry is further configured to continue to randomly select resources from the first resource pool until an expiration of a timer.

12. The wireless device of claim 8, wherein the processing circuitry is further configured to:

receive, from the network node, an eNodeB-scheduled resource configuration message, and wherein the resources of the at least one of the first resource pool and the second resource pool are sensed in response to the eNodeB-scheduled resource configuration message.

13. The wireless device of claim 8, wherein the indication of resources associated with the first resource pool is acquired via a system information block.

14. The wireless device of claim 8, wherein the indication of the resources associated with the first resource pool is acquired via dedicated signaling.

* * * * *